US012363706B2

(12) United States Patent
Takeda et al.

(10) Patent No.: US 12,363,706 B2
(45) Date of Patent: Jul. 15, 2025

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 575 days.

(21) Appl. No.: 17/427,419

(22) PCT Filed: Feb. 1, 2019

(86) PCT No.: PCT/JP2019/003659
§ 371 (c)(1),
(2) Date: Jul. 30, 2021

(87) PCT Pub. No.: WO2020/157962
PCT Pub. Date: Aug. 6, 2020

(65) Prior Publication Data
US 2022/0124763 A1 Apr. 21, 2022

(51) Int. Cl.
*H04W 72/1273* (2023.01)
*H04W 56/00* (2009.01)
*H04W 74/0833* (2024.01)

(52) U.S. Cl.
CPC ........ *H04W 72/1273* (2013.01); *H04W 56/00* (2013.01); *H04W 74/0833* (2013.01)

(58) Field of Classification Search
CPC ............. H04W 72/1273; H04W 56/00; H04W 74/0833; H04W 72/23; H04W 72/12; H04W 48/12; H04W 48/16; H04W 84/047
See application file for complete search history.

(56) References Cited

U.S. PATENT DOCUMENTS

| | | | |
|---|---|---|---|
| 2010/0080139 A1 | 4/2010 | Palanki et al. | |
| 2011/0051654 A1 | 3/2011 | Blankenship et al. | |
| 2012/0069790 A1 | 3/2012 | Chung et al. | |
| 2012/0238202 A1 | 9/2012 | Kim et al. | |

(Continued)

FOREIGN PATENT DOCUMENTS

| | | |
|---|---|---|
| CN | 101790224 A | 7/2010 |
| CN | 103957075 A | 7/2014 |
| WO | 2018/063892 A1 | 4/2018 |

OTHER PUBLICATIONS

Office Action issued in counterpart Japanese Patent Application No. 2020-569315 mailed on Apr. 4, 2023 (6 pages).

(Continued)

*Primary Examiner* — Abdullahi Ahmed
(74) *Attorney, Agent, or Firm* — Osha Bergman Watanabe & Burton LLP

(57) ABSTRACT

A radio communication method according to an aspect of the present invention includes: receiving, at a first base station, at least a part of downlink control information via a downlink shared channel from a second base station; receiving, at user terminal, downlink control information via a downlink control channel from the first base station; and controlling, at the user terminal, reception of a downlink shared channel from the first base station or transmission of an uplink shared channel to the first base station on the basis of the downlink control information.

6 Claims, 11 Drawing Sheets

(56) References Cited

U.S. PATENT DOCUMENTS

| | | | |
|---|---|---|---|
| 2013/0044712 A1 | 2/2013 | Kim et al. | |
| 2019/0357117 A1* | 11/2019 | Cudak | H04W 72/535 |
| 2021/0127389 A1* | 4/2021 | Liu | H04L 5/0087 |
| 2021/0127396 A1* | 4/2021 | Su | H04W 72/1263 |
| 2021/0136805 A1* | 5/2021 | Yeo | H04W 72/535 |
| 2021/0345262 A1* | 11/2021 | Harada | H04W 88/14 |
| 2021/0345345 A1* | 11/2021 | Liu | H04B 7/02 |
| 2022/0007309 A1* | 1/2022 | Dortschy | H04W 52/146 |
| 2022/0007442 A1 | 1/2022 | Novlan et al. | |
| 2022/0248383 A1* | 8/2022 | Park | H04W 72/23 |
| 2022/0322472 A1* | 10/2022 | Kusashima | H04W 76/15 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

International Search Report issued in International Application No. PCT/JP2019/003659 mailed May 14, 2019 (4 pages).

Written Opinion issued in International Application No. PCT/JP2019/003659; Dated May 14, 2019 (3 pages).

Extended European Search Report issued in counterpart European Patent Application No. 19913883.5, mailed on Jul. 1, 2022 (10 pages).

Office Action issued in counterpart Chinese Application No. 201980094375.X, mailed Jul. 20, 2023 (14 pages).

Office Action issued in counterpart Japanese Application No. 2020-569315, mailed Sep. 19, 2023 (6 pages).

Office Action issued in Chinese Application No. 201980094375.X, mailed on Feb. 1, 2024 (12 pages).

Office Action issued in the corresponding Japanese Application No. 2020-569315 on Feb. 27, 2024 (7 pages).

Office Action issued in counterpart Chinese Application No. 201980094375.X, mailed Jun. 1, 2024 (13 pages).

Office Action issued in corresponding European Application No. 19913883.5, mailed May 13, 2024 (4 pages).

Office Action issued in counterpart Japanese Application No. 2020-569315, mailed Jul. 2, 2024 (11 pages).

Office Action issued in Mexican Application No. MX/a/2021/009231, mailed Jul. 11, 2024 (7 pages).

Office Action issued in counterpart Mexican Patent Application No. MX/a/2021/009231 mailed on Dec. 10, 2024 (8 pages).

Office Action issued in counterpart Chinese Patent Application No. 201980094375.X mailed on Jan. 24, 2025 (17 pages).

Office Action issued in Chinese Patent Application No. 201980094375.X, mailed on Sep. 30, 2024 (16 pages).

Office Action issued in Japanese Patent Application No. 2020-569315, mailed on Oct. 1, 2024 (6 pages).

LG Electronics; "Discussion on sidelink resource allocation and configuration for FeD2D"; 3GPP TSG RAN WG1 Meeting #90, R1-1713116; Prague, Czech Republic; Aug. 21-25, 2017 (3 pages).

* cited by examiner

| | LTE-IoT | ASSOCIATED KPI | NR-IoT |
|---|---|---|---|
| MAXIMUM BANDWIDTH | 5MHz | CAPACITY, DATA RATE | 5MHz-10MHz |
| MAXIMUM TBS | DL:4008, UL:6968 | DATA RATE | 10Mbps-100Mbps |
| MODULATION SCHEME | QPSK,16QAM,64QAM | SE, POWER SAVING | QPSK,16QAM,64QAM 256QAM |
| TARGET DOPPLER | 200Hz(120km/h@2GHz) | CARRIER FREQUENCY, MOBILITY | 120km/h@3.5GHz |
| UE POWER CLASS | 14dBm/20dBm/23dBm | POWER SAVING, COVERAGE | - |
| MCL | 155.7 dBm, REPETITION | POWER SAVING, COVERAGE | - |
| MOBILITY | INTRA-BAND AND INTER-BAND HANDOVER | MOBILITY | - |
| BATTERY SAVING | eDRX, WUS, EDT, AND THE LIKE | POWER SAVING, IDLE | POWER SAVING FOR IDLE AND CONNECTED MODES |
| LATENCY | RSS, IMPROVED MIB/SIB, PERFORMANCE | LATENCY REDUCTION FOR IDLE MODE | LATENCY REDUCTION FOR CONNECTED MODE |
| COVERAGE | 100 km, SUB-PRB RA | POWER SAVING, COVERAGE | - |

FIG. 2

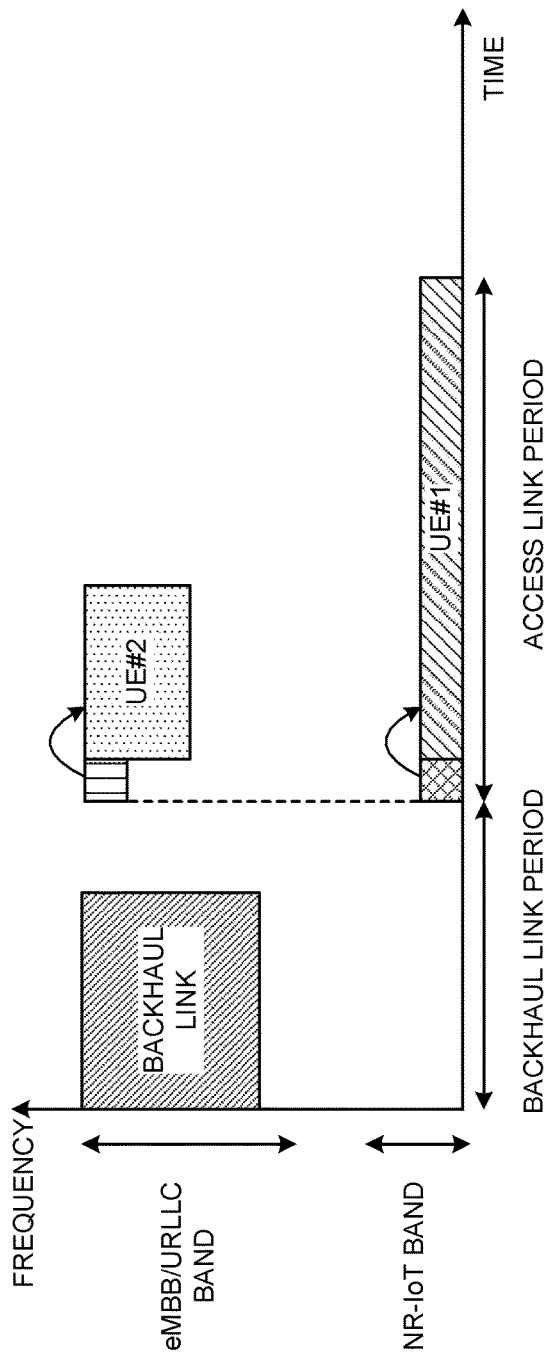
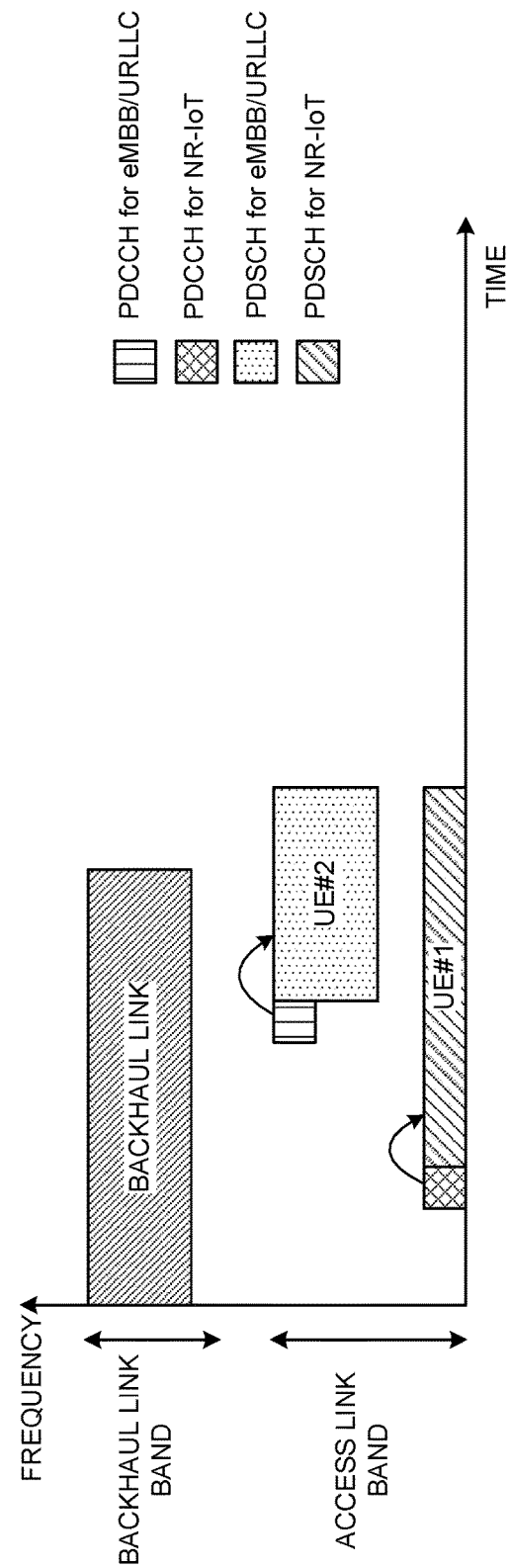

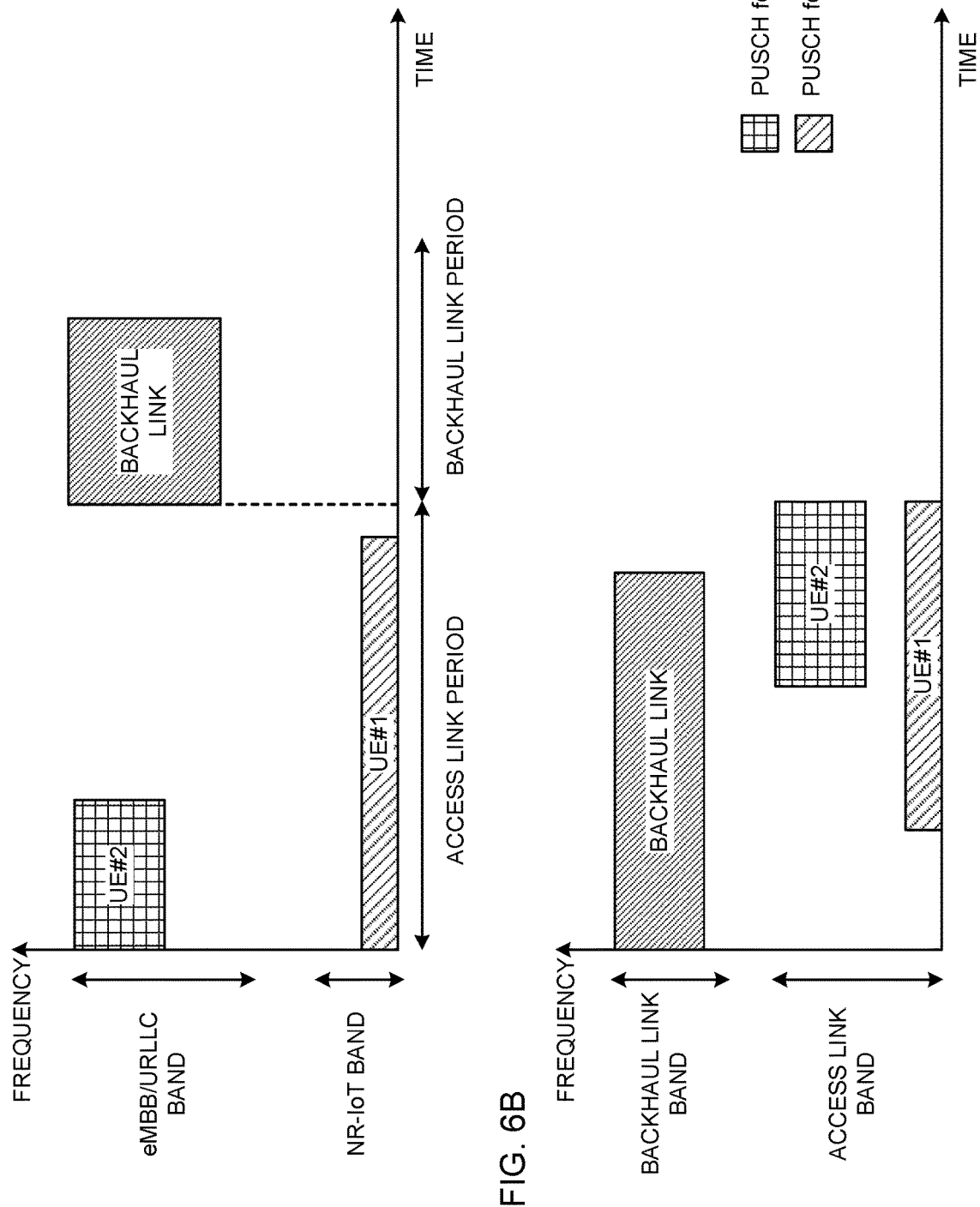

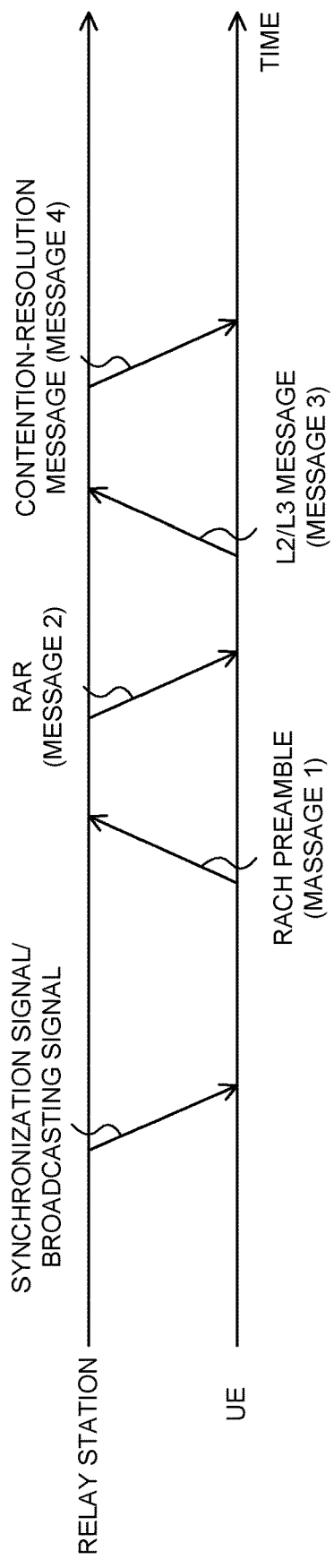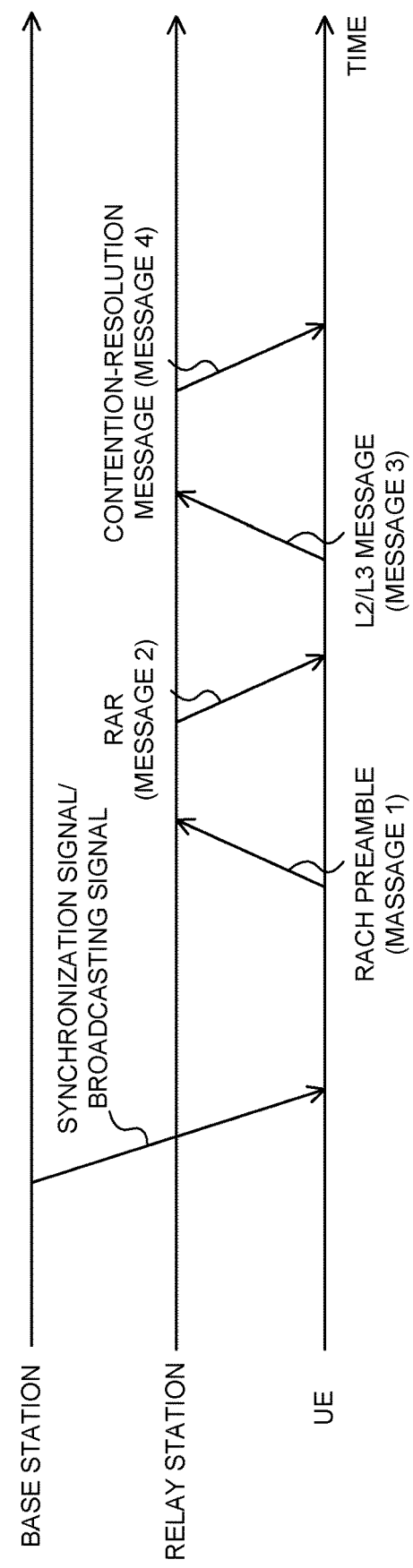

USER TERMINAL AND RADIO COMMUNICATION METHOD

TECHNICAL FIELD

The present invention relates to user terminal and a radio communication method in next-generation mobile communication systems.

BACKGROUND ART

In a universal mobile telecommunications system (UMTS) network, long term evolution (LTE) has been specified for the purpose of further high-speed data rate, low latency, and the like (see Non Patent Literature 1). LTE-Advanced (3GPP Rel. 10 to 14) has been specified for the purpose of further larger capacity and sophistication of LTE (third generation partnership project (3GPP) release (Rel.) 8, 9).

Successor systems of LTE (for example, 5th generation mobile communication system (5G), 5G+(plus), New Radio (NR), New radio access (NX), Future generation radio access (FX), 3GPP Rel. 15 or later versions) are also under study.

In LTE (e.g., LTE Rel. 13 to 15), everything (e.g., object including a sensor and a communication function) is connected to the Internet. Machine type communication (MTC) and narrow band Internet of Things (NB-IoT) have been specified as Internet of Things (IoT) that exchanges various pieces of data (e.g., measurement data, sensor data, and control data). MTC and NB-IoT introduced in LTE are also referred to as LTE-IoT or the like.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (hereinafter, referred to as NR), introduction of a relay technology in which a user terminal (User Equipment (UE)) and a base station communicate via a given apparatus (which is also referred to as a relay station, a relay node, an Integrated Access Backhaul (IAB) node, or the like) has been studied.

For example, in the NR, use of the relay technology for communication for IoT for NR (NR-IoT), which is an extension of LTE-IoT (e.g., MTC, NB-IoT), has also been studied.

As described above, in the NR in which the relay technology is used, how to control communication in a radio link (also referred to as a backhaul link or the like) between the base station and the given apparatus and a radio link (also referred to as an access link or the like) between the given apparatus and the UE becomes a problem. In addition, how the UE accesses the relay station also becomes a problem.

The present invention has been made in view of the above point, and an object of the present invention is to provide a user terminal and a radio communication method capable of appropriately controlling communication using a relay technology.

Solution to Problem

A user terminal according to an aspect of the present invention includes: a receiving section that receives downlink control information via a downlink control channel from a first base station, at least a part of the downlink control information being received by the first base station via a downlink shared channel from a second base station; and a control section that controls reception of a downlink shared channel from the first base station or transmission of an uplink shared channel to the first base station on the basis of the downlink control information.

Advantageous Effects of Invention

According to the present invention, communication using a relay technology can be appropriately controlled.

BRIEF DESCRIPTION OF DRAWINGS

FIG. 2 is a diagram illustrating an example of a requirement targeted by NR-IoT.

FIGS. 5A and 5B are diagrams illustrating an example of a relationship between a backhaul link and an access link in the time domain and the frequency domain of a DL.

FIGS. 6A and 6B are diagrams illustrating an example of a relationship between the backhaul link and the access link in the time domain and the frequency domain of a UL.

FIGS. 7A and 7B are diagrams illustrating an example of first and second access procedures for a relay station according to a second aspect.

DESCRIPTION OF EMBODIMENTS

Figure 1A:
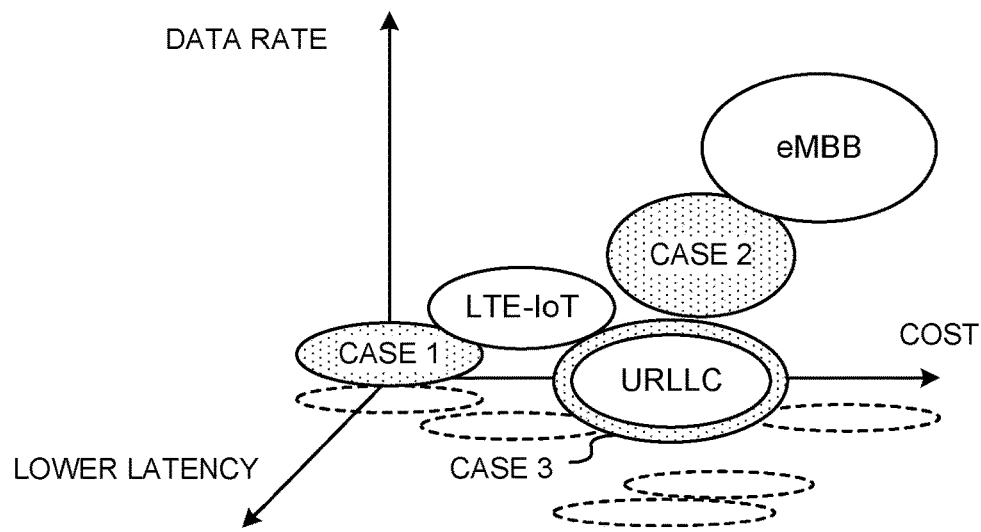
FIGS. 1A to 1C are diagrams illustrating an example of a relationship between LTE-IoT, eMBB, URLLC, and NR-IoT.

In LTE, for example, MTC and NB-IoT are introduced as technologies related to IoT. In MTC, communication of at least one of uplink (UL) and downlink (DL) (UL/DL)) is performed by using a bandwidth narrower than the maximum bandwidth (e.g., 20 MHz) per cell (also referred to as serving cell, component carrier (CC), carrier, and the like) of LTE as the maximum bandwidth.

For example, the maximum bandwidth of MTC is 1.4 MHz or 5 MHz. When sub-carrier spacing (SCS) is 15 kHz, six resource blocks (physical resource block (PRB)) may constitute 1.4 MHz. In addition, 5 MHz may be configured with 25 PRBs in a case where the SCS is 15 kHz. The band for MTC is also called a narrow band (NB), and may be identified by a given index (e.g., narrow band index).

MTC is also called enhanced MTC (eMTC), LTE-MTC (LTE-M), LTE-M1, low cost-MTC (LC-MTC), and the like. Furthermore, a device that performs MTC is also called an MTC terminal, at least one UE (BL/CE UE) of bandwidth reduced low complexity (BL) and coverage enhancement (CE), or the like.

In the NB-IoT, for example, UL/DL communication is performed by using a bandwidth (e.g., 200 kHz) narrower than the maximum bandwidth of MTC as the maximum bandwidth. For example, the maximum bandwidth of the NB-IoT is 200 kHz. When the sub-carrier spacing is 15 kHz, 1 PRB may constitute 200 kHz. NB-IoT is also called narrow band LTE (NB-LTE), narrow band cellular Internet of Things (NB cellular IoT), clean slate, and the like.

In the NR, in addition to a service (for example, enhanced mobile broad band (eMBB) or the like) in which at least one of high speed and large capacity is set as a requirement, it is assumed that a service (for example, ultra reliable and low latency communications (URLLC), vehicle-to-everything (V2X), and the like) of a new requirement (for example, at least one of low latency and high reliability) is studied. The NR-based technology assuming a service of a new requirement is also called NR-IoT, 5G IoT, or the like.

As the technology related to the NR-IoT, for example, at least one of the following may be assumed.

Industrial IoT (also referred to as URLLC or the like)
  Internet of Health Things (IoHT) that enables a user (for example, a patient) and a medical institution or company to be connected via a network and perform diagnosis, symptom improvement, health promotion, and the like
  Wearable IoT (also referred to as a wearable device, wearable terminal, or the like)
  A smart meter capable of transmitting a measurement result of a usage amount (for example, electricity, gas, and the like) to a server
  IoT relay In the NR-IoT as described above, it may be specified by at least one axis (dimension) of data rate (throughput), latency (lower latency), reliability, cost, capacity, mobility, coverage, power consumption, and massive connectivity.

Furthermore, various types of future devices may be considered in the NR-IoT. For example, the type of the device (terminal) may be at least one of wearable, augmented reality (AR), virtual reality (VR), and mixed reality (MR).

Figure 1B:
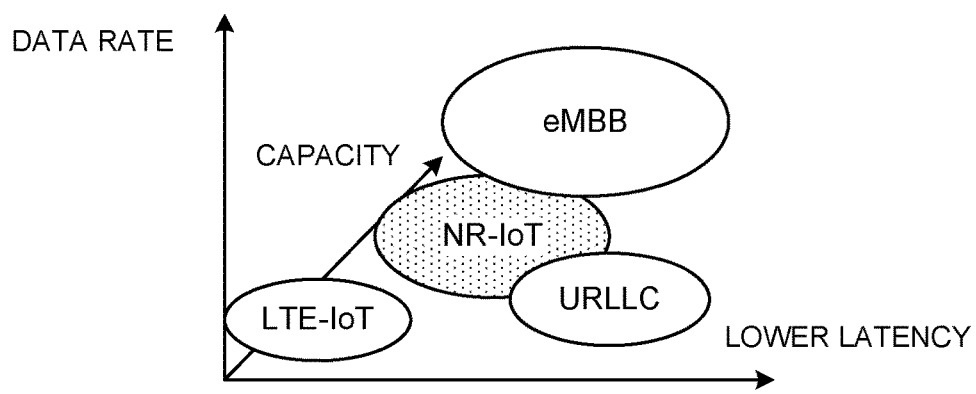
Figure 1C:
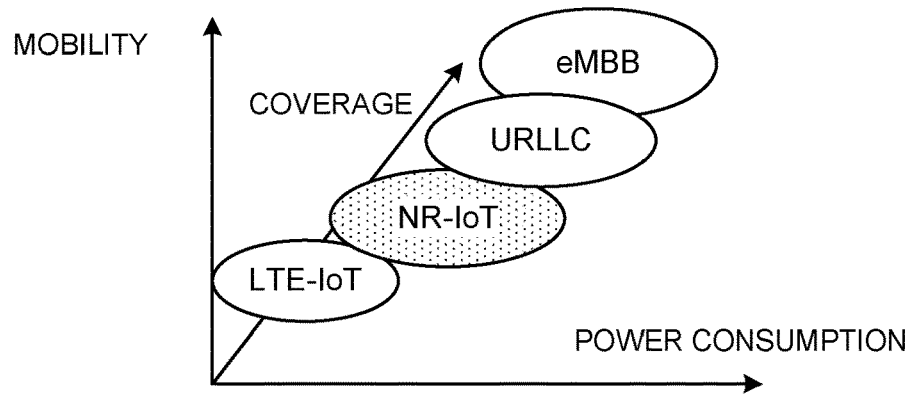

FIGS. 1A to 1C are diagrams illustrating an example of a relationship between LTE-IoT, eMBB, URLLC, and NR-IoT. As illustrated in FIG. 1A, in a case of using three dimensions: data rate, cost, and low latency, at least one of Cases 1 to 3 may be assumed in the NR-IoT.

As illustrated in FIG. 1A, Case 1 includes a terminal with low cost. The terminal may not be required to have a low latency and need not be required to have a high data rate. For example, the terminal in Case 1 may satisfy at least one of an extremely low cost and extremely high energy efficiency terminal (almost cost-zero and ultra energy efficient terminal). Specifically, the terminal may satisfy at least one of almost zero product cost and charging using renewable energy or wireless power transfer.

Case 2 includes a terminal having a medium data rate (throughput). It is sufficient if the data rate (throughput) of the terminal is between LTE IoT (for example, up to 1 Mbps) and eMBB (for example, 2.5 Gbps to 5 Gbps), for example, 10 Mbps to 100 Mbps. The terminal in Case 2 may be used for, for example, video surveillance (video-surveillance).

Note that, as illustrated in FIG. 1A, the terminal in Case 2 may satisfy a medium cost (for example, cost higher than LTE-IoT and lower than eMBB) and a medium low latency (for example, cost higher than LTE-IoT and lower than eMBB).

As Case 3, there is a terminal (for example, a terminal for URLLC is included) having a high requirement for low latency. The terminal may satisfy a medium cost (for example, cost higher than LTE-IoT and lower than eMBB), and the requirement for data rate need not be high. The terminal in Case 3 may be used for real-time monitoring and analysis, a remote control drone, intelligent devices, and the like.

Note that although not illustrated, a dimension of massive connectivity may be added in FIG. 1A. A terminal suitable for massive connectivity may accelerate smart city and manufacturing.

FIG. 1B illustrates a relationship between LTE-IoT, eMBB, URLLC, and NR-IoT using three dimensions: data rate (throughput), capacity, and low latency. As illustrated in FIG. 1B, the NR-IoT may have a higher data rate (for example, a data rate close to eMBB), a lower latency (for example, a low latency close to URLLC).

FIG. 1C illustrates a relationship between LTE-IoT, eMBB, URLLC, and NR-IoT using three dimensions: mobility, coverage, and power consumption. As illustrated in FIG. 1C, the NR-IoT may support medium to high mobility (middle-to-high mobility) (for example, mobility higher than LTE-IoT and lower than URLLC), assuming utilization of a higher carrier frequency (for example, 3.5 GHz).

FIG. 2 is a diagram illustrating an example of a requirement targeted by NR-IoT. As illustrated in FIG. 2, the NR-IoT requirement may be specified by at least one of a maximum bandwidth, a maximum transport block size (TBS), a modulation scheme, a target Doppler, a power class of a terminal (user terminal (UE)), a maximum coupling loss (MCL), mobility, battery saving, latency, and coverage.

In FIG. 2, requirements of NR-IoT and LTE-IoT and an index indicating an intermediate goal (key performance indicator (KPI)) are illustrated for each item, which is the requirement. Note that the items and numerical values of the items, which are the requirements, illustrated in FIG. 2 are merely examples, and are not limited to those illustrated.

As illustrated in FIG. 2, the maximum bandwidth of the NR-IoT is, for example, 5 MHz to 10 MHz, and may have a maximum bandwidth wider than that of the LTE-IoT. Furthermore, the maximum TBS of the NR-IoT may be larger than the maximum TBS of at least one of uplink and downlink of the LTE-IoT. Furthermore, the modulation scheme of the NR-IoT may support a higher order modulation scheme than that of the LTE-IoT (for example, 256 QAM).

Furthermore, in the NR-IoT, a Doppler frequency having a moving speed equivalent to that of the LTE-IoT (for example, 120 km/h) (for example, in LTE-IoT, 120 km/h at 2 GHz) at a frequency higher than that of the LTE-IoT (for example, 3.5 GHz) may be targeted.

Furthermore, in the NR-IoT, the power class of the UE, the maximum coupling loss (MCL), the mobility, and the coverage need not be included in or may be included in the requirements. Note that the coupling loss may be defined by a propagation loss according to a separation distance of a cell radius from the base station, the cell radius being a distance from the base station capable of providing a certain communication speed.

Furthermore, in the NR-IoT, power saving for an idle mode and a connected mode (also referred to as an RRC idle mode, an RRC connected mode, and the like) may be specified as the requirement. Furthermore, in the NR-IoT, latency reduction for the connected mode may be specified as the requirement.

As described above, in the NR-IoT, a medium requirement (for example, a requirement higher than LTE-IoT and lower than eMBB) may be specified for one or more items. Note that the above NR-IoT requirements are merely examples, and are not limited to those described above. It is sufficient if the NR-IoT requirements are those specified assuming at least a use case different from that of the eMBB.

Meanwhile, in the NR, introduction of a relay technology in which the UE and the base station communicate via a given apparatus (which is also referred to as a relay station, a relay node, an Integrated Access Backhaul (IAB) node, or the like) has been studied. Furthermore, use of a relay technology for the above-described NR-IoT has also been studied.

Figure 3:
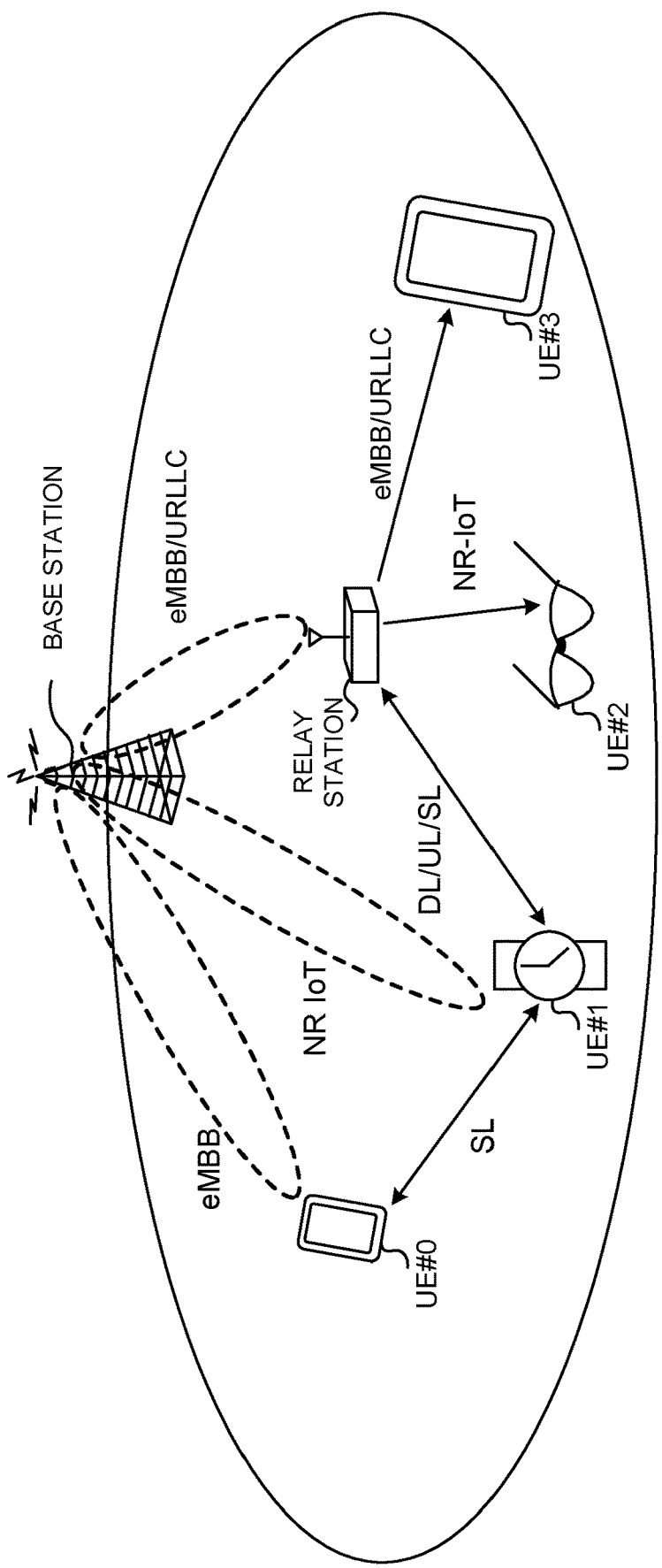
FIG. 3 is a diagram illustrating an example of NR-IoT communication using a relay technology.

FIG. 3 is a diagram illustrating an example of NR-IoT communication using a relay technology. As illustrated in FIG. 3, the base station may communicate with one or a plurality of pieces of UE and one or a plurality of relay stations. Furthermore, the relay station may communicate with one or a plurality of pieces of UE.

For example, in FIG. 3, UE #0 performs communication using the eMBB (eMBB communication) with the base station. UE #1 performs communication using the NR-IoT (NR-IoT communication) with the base station. The relay station performs communication using at least one of the eMBB and the URLLC (eMBB/URLLC communication) with the base station. Further, the relay station may communicate with one or a plurality of pieces of UE by at least one of DL, UL, and terminal-to-terminal communication (device to device (D2D), for example, sidelink (SL), Bluetooth (registered trademark), or the like). Furthermore, the relay station may perform the NR-IoT communication with UE #2 and perform the eMBB/URLLC communication with UE #3.

In the NR-IoT communication illustrated in FIG. 3, the same numerology as the NR (for example, eMBB/URLLC communication) may be used. The numerology may be paraphrased, for example, as sub-carrier spacing (SCS) or symbol length. For example, at least one of 15 kHz, 30 kHz, 60 kHz, 120 kHz, and 240 kHz may be supported as the SCS. Note that the SCS and the symbol length may have a reciprocal relationship.

Furthermore, in the NR-IoT communication, at least one of a slot and a time unit shorter than the slot (also referred to as a subslot, a mini slot, or the like) may be supported. The slot may include, for example, 14 symbols. In addition, the subslot may include seven symbols, three or four symbols, or two symbols.

Furthermore, simplified beam management may be supported in the NR-IoT communication. For example, the UE may have a given number of antennas (for example, one or two antennas). In addition, the UE may support a higher order modulation scheme (for example, 256 QAM). On the other hand, in the eMBB/URLLC communication, beam management that is more advanced than that of the NR-IoT communication may be supported.

It is sufficient if the relay station illustrated in FIG. 3 is a given apparatus such as a base station, IAB, or UE, for example. IAB is a technology that uses NR communication as a backhaul between base stations (or between the base station and the relay station). In particular, it is expected that IAB using the NR communication using millimeter waves can expand the coverage area at low cost.

An IAB node may have at least one function such as distribution unit (DU), central unit (CU), or mobile termination (MT). Therefore, the IAB node may function as a base station or a relay station, or may function as UE.

Note that IAB may be referred to as a radio backhaul or the like. A link between IAB nodes may be referred to as a backhaul link. A link between the IAB node and the UE may be referred to as an access link. The IAB node may use communication using the NR for the backhaul link. The IAB node may use communication using the NR for the access link, or may use communication based on another radio access technology (RAT).

With the introduction of IAB, base stations can use the same frequency for backhaul and UE access simultaneously or by switching, and thus it is expected to improve frequency utilization efficiency, for example.

Furthermore, in the NR-IoT communication, sidelink assisted IoT (IoT) using terminal-to-terminal communication (for example, SL, bluetooth (registered trademark), and the like) may be supported. For example, in FIG. 3, in a case where the same user holds UE #0 (for example, a smartphone) and UE #1 (for example, a wearable device such as of a wristwatch type, a headphone type, or a spectacle type), UE #0 and UE #1 may be paired. In this case, it may be assumed that UE #0 and UE #1 are transmitted by the same beam, and information regarding at least one of the beam, the position and the like of any of UE #0 and UE #1 may be used by the other via an SL.

Note that the beam may be paraphrased as a state of a transmission configuration identifier (transmission configuration indicator or indication (TCI)) (TCI state), a relationship of quasi-co-location (QCL), an identifier of a resource of a sounding reference signal (SRS) (SRS resource identifier (SRS resource indicator (SRI))), or the like.

Furthermore, in the NR-IoT communication, connection with a plurality of RATS (for example, LTE and NR) (multi-connectivity) or connection with a single RAT (for example, NR) may be supported.

As described above, in the NR using the relay technology, how to control communication in the backhaul link between the base station and the relay station and the access link between the relay station and the UE is a problem. Therefore, the present inventors have conceived of optimizing communication in a backhaul link and an access link by supporting a relay station that performs a plurality of communications having different use cases (for example, NR-IoT communication and eMBB/URLLC communication) (first aspect).

In addition, in the NR using the relay technology, how the UE performs access (initial access, random access) to the relay station also becomes a problem. Therefore, the present inventors have conceived that by transmitting at least one of a synchronization signal and a broadcast signal from a base station or a relay station, access to the relay station is enabled while interference between the base station and the relay station is prevented (second aspect).

Hereinafter, embodiments according to the present disclosure will be described in detail with reference to the drawings. Hereinafter, a case where a plurality of communications having different use cases performed using a relay station is eMBB/URLLC communication and NR-IoT communication will be exemplified, but it is not limited thereto.

Furthermore, in the NR-IoT communication, a given channel and/or signal (channel/signal) is used in the same manner as in the NR (for example, eMBB/URLLC communication), but may be specified independently of the NR. It is sufficient if the given channel/signal is at least one of a broadcast channel (physical broadcast channel (PBCH)), a downlink control channel (physical downlink control channel (PDCCH)), a downlink shared channel (physical downlink shared channel (PDSCH)), a random access channel (physical random access channel (PRACH)), an uplink shared channel (physical uplink shared channel (PUSCH)), a primary synchronization signal (PSS), a secondary synchronization signal (SSS), and a reference signal (RS).

Information (for example, any character string) indicating that it is for NR-IoT may be added to such channel/signal for NR-IoT communication to distinguish it from each channel/signal for NR. For example, a PDCCH for NR-IoT may be referred to as an XPDCCH (X is an arbitrary character string). The same applies to the other channels. Note that a channel/signal having the same name as that of the NR may be used as at least a part of the channel/signal for NR-IoT communication.

Hereinafter, the channel/signal for NR-IoT communication uses the same name as the channel/signal for eMBB/URLLC communication, but as described above, it is of course not limited thereto.

(First Aspect)

In the first aspect, communication using a relay station (first base station) supporting a plurality of communications (for example, NR-IoT communication and eMBB/URLLC communication) having different use cases will be described.

In the first aspect, the communication of the first use case (for example, NR-IoT communication) or the communication of the second use case (for example, eMBB/URLLC communication) is performed in the access link (also referred to as a first radio link, a first link, a first radio interface, or the like) between the UE and the relay station.

On the other hand, in the backhaul link (also referred to as a second radio link, a second link, a second radio interface, or the like) between the relay station and the base station (second base station), regardless of whether the UE is the first or second use case, the data of the UE (at least one of uplink data and downlink data) may be transmitted using the communication of the second use case.

Here, in the communication of the first use case, for example, at least one of the maximum bandwidth, the maximum TBS, the target Doppler, and the maximum order of the available modulation scheme may be limited as compared with the communication of the second use case. Furthermore, the communication of the first use case may be inferior in performance (for example, data rate, capacity, mobility, and the like; see FIGS. 1A to 1C) to the communication of the second use case. Note that, in the present embodiment, the "use case" may be paraphrased as a "requirement", a "communication method", a "type", or the like.

The communication in the backhaul link and the access link may be multiplexed using at least one of a time domain, a frequency domain, and a space domain. That is, the backhaul link and the access link may be multiplexed using at least one of time division multiplexing (TDM), frequency division multiplexing (FDM), or space division multiplexing (SDM).

Figure 4:
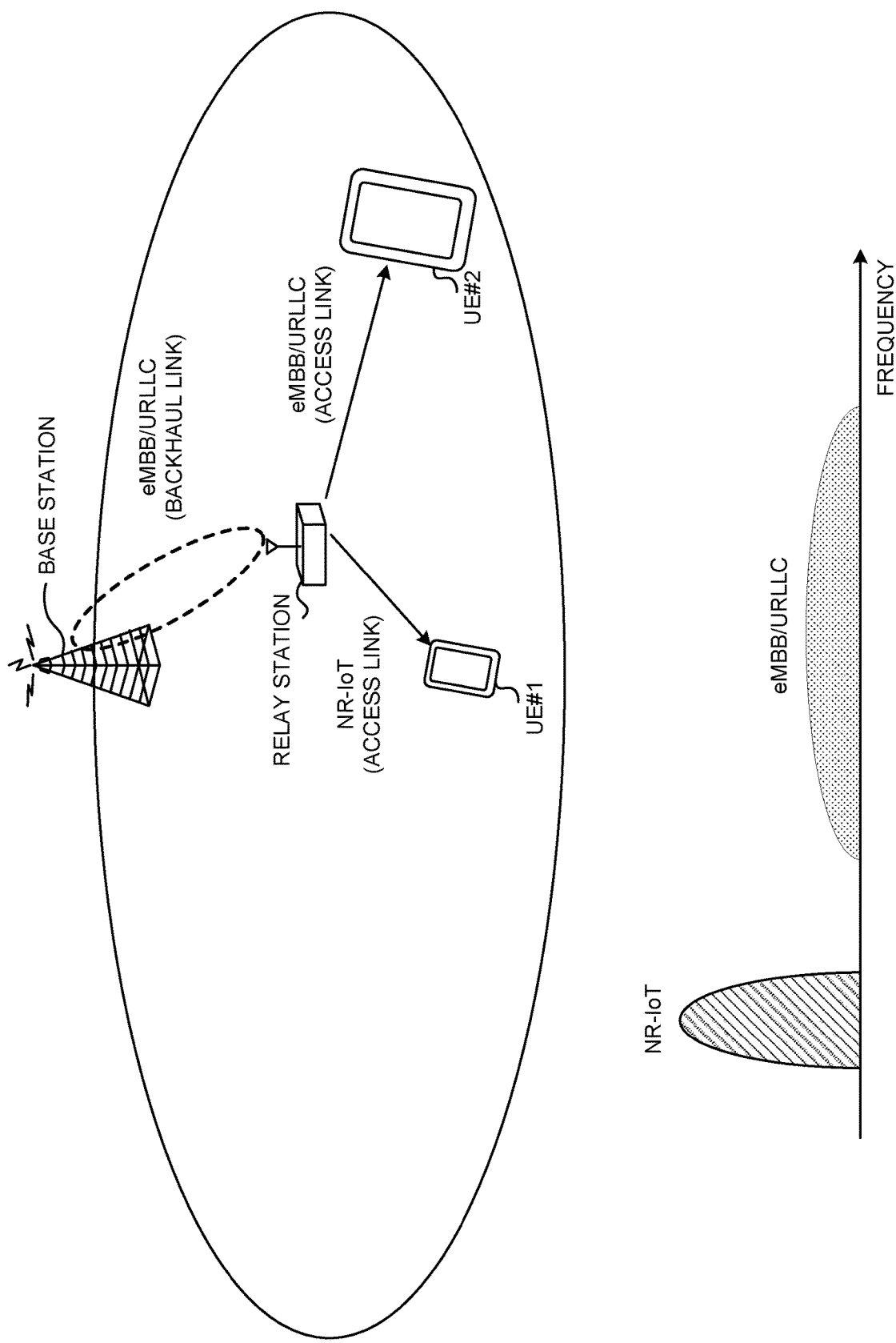
FIG. 4 is a diagram illustrating an example of communication using a relay station according to a first aspect.

FIG. 4 is a diagram illustrating an example of communication using a relay station according to the first aspect. Note that FIG. 4 illustrates a case where the communication of the first use case is NR-IoT communication and the communication of the second use case is eMBB/URLLC communication, but of course the communications of the first and second use cases are not limited thereto.

<DL>

In the DL, the relay station may receive downlink data for one or more pieces of UE (here, UE #1 and UE #2) via the PDSCH from the base station in the backhaul link. The relay station may receive downlink data for one or more pieces of UE multiplexed on a single PDSCH, or may receive downlink data for each UE by the PDSCH for each UE. Note that, in the following description, the downlink data may include at least one of user data and control information of a higher layer (for example, RRC layer or MAC layer).

Control information used for transmission of downlink data in an access link may be multiplexed (included) in the PDSCH from the base station. Specifically, the control information may include at least a part of DCI used for scheduling a PDSCH (for example, at least one of a PDSCH for NR-IoT communication and a PDSCH for eMBB/URLLC communication) transmitted in an access link.

For example, the control information may include information regarding at least one of the following parameters (field values) for each PDSCH transmitted in the access link.

Time domain resource
Frequency domain resource
Modulation and coding scheme
New data identifier
Redundancy version
HARQ process number
Transmission power control command for PUCCH
Identifier of PUCCH resource
Identifier of feedback timing of delivery confirmation information (also referred to as hybrid automatic repeat request acknowledgement (HARQ-ACK), ACK/NACK, and the like) for PDSCH
Downlink allocation index
Transmission configuration identifier (information indicating TCI state)
Antenna port
Transmission information of a code block group (CBG)
Number of times of repetition (aggregation factor)
Number of resource unit (for example, a control channel element (CCE)) aggregations used for transmission of DCI Note that which use case the control information is for PDSCH may be identified by a given identifier (header) added to the control information. For example, a header indicating NR-IoT may be added to at least one of the control information for NR-IoT communication and the downlink data.

The relay station performs processing of receiving (for example, at least one of reception, demodulation, and decoding) at least one of the downlink data and the control information for the UE via the PDSCH of the backhaul link. The relay station may generate DCI in a given format on the basis of the control information and transmit the DCI via the PDCCH of the access link.

Note that the format of the DCI used for scheduling the PDSCH for the NR-IoT communication may be the same as or different from the format of the DCI (for example, DCI format 1_0 or 1_1) used for scheduling the PDSCH for the NR-IoT communication.

In addition, the relay station may transmit the downlink data received in the backhaul link for each UE via the PDSCH for the access link. Note that the number of times of repetition of the PDSCH may be determined by the base station and its notification may be given to the relay station (may be included in the control information), or the number of times of repetition of the PDSCH may be determined by the relay station. When the relay station determines the number of times of repetition, the relay station may feed back (transmit or give a notification of) the determined number of times of repetition to the base station.

In addition, the relay station may multiplex the backhaul link and the access link in at least one of the time domain, the frequency domain, and the space domain. Furthermore, the relay station may multiplex (divide) a plurality of communications (for example, eMBB/URLLC communication and NR-IoT communication) having different use cases using at least one of TDM, FDM, and SDM.

For example, in FIG. 4, the NR-IoT communication and the eMBB/URLLC communication are distinguished in the frequency domain (different bands are allocated). As illustrated in FIG. 4, a band (for example, 800 MHz or 2 GHz) lower than a band (for example, 3.5 GHz band) used for the eMBB/URLLC communication may be applied to the NR-IoT communication.

FIGS. 5A and 5B are diagrams illustrating an example of a relationship between a backhaul link and an access link in the time domain and the frequency domain of a DL. Note that, in FIGS. 5A and 5B, for example, as illustrated in FIG. 4, it is assumed that UE #1 and UE #2 belong to the relay station.

In FIG. 5A, an example in which a backhaul link and an access link are time-divided is illustrated. As illustrated in FIG. 5A, the relay station may communicate with one or more pieces of UE in an access link period (first period) and communicate with the base station in a backhaul link period (second period).

Furthermore, as illustrated in FIG. 5A, the eMBB/URLLC band and the NR-IoT band may be frequency-divided. For example, in FIG. 5A, since UE #1 performs the NR-IoT communication, UE #1 may receive the downlink data via the PDSCH scheduled in the NR-IoT band. In addition, since UE #2 performs the eMBB/URLLC communication, UE #2 may receive the downlink data via the PDSCH scheduled in the eMBB/URLLC band.

As described above, the relay station may generate the DCI used for scheduling the PDSCH in the access link period on the basis of the control information received via the PDSCH in the backhaul link period. For example, the relay station may receive at least a part of the DCI as the higher layer control information via the PDSCH in the backhaul link period.

Alternatively, the relay station may generate the DCI used for scheduling the PDSCH in the access link period on the basis of the feedback information (for example, UCI including HARQ-ACK) from the UE. For example, in a case where the relay station does not perform control information via the PDSCH in the backhaul link period, the relay station may perform scheduling or the like on the basis of feedback information or the like from the UE, and generate the DCI used for scheduling the PDSCH in the access link period in the relay station.

Note that, in FIG. 5A, the eMBB/URLLC band and the NR-IoT band are different bands, but the PDSCH for eMBB/URLLC and the PDSCH for NR-IoT may be allocated in the same band (for example, a carrier, a cell, or the like).

On the other hand, in FIG. 5B, an example in which a backhaul link and an access link are frequency-divided is illustrated. In FIG. 5B, the relay station may perform PDSCH reception processing (for example, demodulation, decoding, and the like) in the backhaul link band and PDSCH transmission processing (for example, encoding, modulation, and the like) in the access link band in parallel.

For example, in FIG. 5B, the relay station performs processing of receiving the downlink data of UE #1 and UE #2 via the PDSCH of the backhaul link. In parallel, the relay station may transmit the downlink data for UE #1 received in the backhaul link via the PDSCH for NR-IoT scheduled in the access link band. In addition, the relay station may transmit the downlink data for UE #2 received in the backhaul link via the PDSCH for eMBB scheduled in the access link band.

Note that FIGS. 5A and 5B illustrate an example in which the backhaul link and the access link are subjected to TDM or FDM. However, the backhaul link and the access link may be independently multiplexed with a plurality of different use cases (for example, eMBB/URLLC communication and NR-IoT communication) by at least one of TDM, FDM, and SDM.

As described above, the relay station may generate the DCI used for scheduling the PDSCH in the access link band on the basis of the control information received via the PDSCH scheduled in the backhaul link band. For example, the relay station may receive at least a part of the DCI as the higher layer control information via the PDSCH allocated to the backhaul link band.

<UL>

In the UL, the relay station may receive uplink data via the PUSCH from each UE in the access link. In addition, the relay station may receive uplink control information (UCI) via a PUCCH or a PUSCH from each UE in the access link.

In addition, the relay station may transmit the uplink data received via the access link via the PUSCH of the backhaul link. The relay station may transmit at least a part of the UCI received via the access link via the PUSCH of the backhaul link.

The relay station may multiplex uplink data from each UE on a single PUSCH in the backhaul link and transmit the data, or may transmit the data using the PUSCH for each UE. Similarly, the relay station may multiplex at least a part of the UCI from each UE on a single PUSCH in the backhaul link and transmit the data, or may transmit the data using the PUSCH for each UE. Note that, in the following description, the uplink data may include at least one of user data and control information of a higher layer (for example, RRC layer or MAC layer).

The UCI may include, for example, at least one of channel state information (CSI), delivery confirmation information (HARQ-ACK) for the PDSCH, and a scheduling request (SR). In addition, the CSI may include a plurality of parts (for example, CSI parts 1 and 2). The relay station may feed back all of the pieces of UCI received from the UE to the base station, or may feed back some of the pieces of UCI to the base station and need not feed back the rest to the base station.

For example, the relay station may retain a buffer that stores the downlink data received from the base station. In this case, the relay station may control retransmission of the downlink data stored in the buffer on the basis of the HARQ-ACK without feeding back the HARQ-ACK received from the UE to the base station.

The radio resource (for example, a PUCCH resource, a PUCCH resource set, or the like) of the UCI used in the backhaul link may be configured by the base station. In addition, the radio resource (for example, a PUCCH resource, a PUCCH resource set, or the like) of the UCI used in the access link may be configured by the base station or may be configured by the relay station.

In addition, in the UL, as described regarding the DL, the relay station may multiplex the backhaul link and the access link in at least one of the time domain, the frequency domain, and the space domain. Furthermore, the relay station may multiplex (divide) a plurality of communications (for example, eMBB/URLLC communication and NR-IoT communication) having different use cases using at least one of TDM, FDM, and SDM.

FIGS. 6A and 6B are diagrams illustrating an example of a relationship between the backhaul link and the access link in the time domain and the frequency domain of a UL. Note that, in FIGS. 6A and 6B, for example, as illustrated in FIG. 4, it is assumed that UE #1 and UE #2 belong to the relay station. Further, referring to FIGS. 6A and 6B, differences from FIGS. 5A and 5B will be mainly described.

In FIG. 6A, an example in which a backhaul link and an access link are time-divided is illustrated. For example, in FIG. 6A, UE #1 may transmit the uplink data via the PUSCH scheduled in the NR-IoT band. In addition, UE #2 may receive the uplink data via the PUSCH scheduled in the eMBB/URLLC band.

Note that the DCI used for scheduling the PUSCH of the access link may be generated on the basis of control information transmitted from the base station via the PDSCH in the backhaul link of the DL. For example, at least a part of the DCI may be transmitted as the higher layer control information from the base station to the relay station.

Alternatively, when the relay station does not perform control information via the PDSCH in the backhaul link period, the DCI used for scheduling the PUSCH in the access link period may be generated by the relay station.

On the other hand, in FIG. 6B, an example in which a backhaul link and an access link are frequency-divided is illustrated. In FIG. 6B, the relay station performs processing of receiving the uplink data of UE #1 and UE #2 via the PUSCH scheduled in the access link band. In parallel, the relay station may transmit the uplink data from UE #1 and UE #2 via the PUSCH scheduled in the backhaul link band.

Although the case where the UE is NR-IoT has been described above, the UE may be LTE-IoT (for example, eMTC or NB-IoT) or the like. At this time, the physical channel used for the access link may be a physical channel dedicated to eMTC or NB-IoT (for example, NPUSCH in NB-IoT).

As described above, in the first aspect, even in a case where the communication of the first use case (for example, NR-IoT communication) is performed in the access link, the radio resource of the base station can be efficiently used by using the communication of the second use case (for example, eMBB/URLLC communication) having higher performance (for example, data rate, capacity) than the first use case in the backhaul link.

(Second Aspect)

In the second aspect, a procedure of access to a relay station (also referred to as initial access, random access, or the like) will be described.

In the second aspect, the relay station may transmit at least one of the synchronization signal and the broadcast signal (synchronization signal/broadcast signal) (first access procedure), or need not transmit the synchronization signal/broadcast signal (second access procedure). The synchronization signal may be at least one of the PSS and the SSS.

The broadcasting signal may be at least one of the PBCH, the broadcast information (for example, a master information block (MIB)), the system information (for example, a system information block) broadcast by the PDSCH, or the like. Note that the block including the synchronization signal/broadcast signal may be referred to as an SS block (SSB), a synchronization signal block, an SS/PBCH block, or the like.

The synchronization signal/broadcast signal transmitted from the relay station may be specified on the basis of an identifier (also referred to as, for example, a physical cell identifier (PCI), a cell ID, or the like) that is the same as or different from the base station to which the relay station belongs. For example, the sequence of the synchronization signal transmitted from the relay station may be specified on the basis of at least a part of the cell ID of the base station.

The coverage of the base station can be expanded by the relay station transmitting the synchronization signal/broadcast signal based on the same identifier (for example, cell ID) as that of the base station.

Alternatively, the relay station need not transmit the synchronization signal/broadcast signal in order to reduce interference with the signal from the base station. In this case, the UE may detect the relay station in the base station on the basis of the information in the broadcasting signal (for example, MIB or SIB) transmitted from the base station and perform the access procedure for the relay station.

<First Access Procedure>

FIG. 7A is a diagram illustrating an example of the first access procedure for the relay station according to the second aspect. As illustrated in FIG. 7A, in the first access procedure, the relay station itself may transmit the synchronization signal/broadcast signal. As described above, at least one of the sequence of the synchronization signal/broadcast signal and the transmission resource may be determined on the basis of the same cell ID as that of the base station.

For example, in FIG. 7A, the relay station transmits the SS/PBCH block at a certain periodicity. For example, the UE detects the SS/PBCH block transmitted from the relay station and acquires broadcast information (for example, MIB) transmitted by the PBCH. The UE acquires system information (for example, SIB1) on the basis of the information in the MIB.

The UE may transmit a RACH preamble (message 1) randomly selected from a plurality of RACH preambles (a random access preamble, a PRACH preamble, a preamble, or the like) indicated by the configuration information (also referred to as RACH-Config, RACH configuration information, or the like) related to the RACH to the relay station via the PRACH.

Note that the RACH configuration information may be included in at least one of the broadcast information, the system information, and the higher layer message (for example, the RRC message). Furthermore, the RACH configuration information may include information indicating a resource (for example, at least one of the time domain resource and the frequency domain resource) used for transmission of the selected RACH preamble.

Furthermore, at least one of the broadcast information and the system information for the NR-IoT communication may be the same as or different from that for the eMBB/URLLC communication. Furthermore, a set of RACH preambles for NR-IoT communication may be common to that for eMBB/URLLC communication, or may be independent from that for eMBB/URLLC communication.

When detecting the RACH preamble, the relay station transmits a random access response (RAR) as a response (message 2). When the UE fails to receive the RAR within a given period (RAR window) after the transmission of the RACH preamble, the transmit power of the PRACH may be increased and the preamble may be transmitted again (re-transmitted).

The UE that has received the RAR adjusts UL transmission timing on the basis of timing advance (TA) included in the RAR, and establishes the UL synchronization. In addition, the UE transmits a control message of the higher layer (L2/L3: Layer 2/Layer 3) by using the PUSCH scheduled by the UL grant in the RAR (message 3). The control message includes a UE identifier (UE-ID). The identifier of the user terminal may be, for example, a given RNTI or the UE-ID of a higher layer.

The relay station transmits a contention-resolution message in response to the control message of the higher layer (message 4). The contention-resolution message is transmitted on the basis of an identifier address of the user terminal included in the control message. The user terminal that succeeds in detecting the contention-resolution message transmits an acknowledge (ACK) in hybrid automatic repeat request (HARQ) to the relay station. As a result, the UE in the idle state may transition to the RRC connected state.

On the other hand, the UE that fails to detect the contention-resolution message determines that the contention has occurred, reselects the RACH preamble, and repeats the random access procedures of the messages 1 to 4.

As illustrated in FIG. 7A, when the relay station transmits the synchronization signal/broadcast signal, the UE can connect to the relay station without assistance by the base station. For example, in an area in which base stations are not densely arranged (an area in which the influence of interference between base stations is relatively small), the coverage of the base station can be expanded by the relay station transmitting the synchronization signal/broadcast signal based on the same cell ID as that of the base station.

<Second Access Procedure>

FIG. 7B is a diagram illustrating an example of the second access procedure for the relay station according to the second aspect. As illustrated in FIG. 7B, in the second access procedure, the relay station itself may not transmit the synchronization signal/broadcast signal, and the base station communicating with the relay station via the backhaul link may transmit the synchronization signal/broadcast signal.

For example, in FIG. 7B, the base station transmits the SS/PBCH block at a certain periodicity. For example, the UE detects the SS/PBCH block transmitted from the relay station and acquires broadcast information (for example, MIB) transmitted by the PBCH. The UE acquires system information (for example, SIB1) on the basis of the information in the MIB.

The UE receives the RACH configuration information included in at least one of broadcast information, system information, and a higher layer message (for example, RRC message) transmitted from the base station. The UE may transmit the RACH preamble (message 1) randomly selected from the set of a plurality of RACH preambles indicated by the RACH configuration information to the relay station via the PRACH.

Note that, in the RACH configuration information, a set of RACH preambles for accessing the base station and a set of RACH preambles for accessing the relay station may be separately (independently) indicated. Alternatively, the UE may determine whether each RACH preamble indicated by the RACH configuration information is for access to the base station or the relay station according to a given rule (for example, the preamble index).

In FIG. 7B, a procedure after the UE transmits the RACH preamble to the relay station is similar to that in FIG. 7A.

As illustrated in FIG. 7B, in a case where the relay station itself does not transmit the synchronization signal/broadcast signal and the UE performs only a part of the access procedure based on the synchronization signal/broadcast signal from the base station (for example, the transmission of the RACH preamble and after) with respect to the relay station, it is possible to reduce the influence of interference of the relay station with the base station or another adjacent base station.

As described above, in the second aspect, by transmitting the synchronization signal/broadcast signal from the base station or the relay station, the UE can access the relay station while preventing interference between the base station and the relay station.

In the above description, the case of using the messages 1 to 4 for the access link has been described as an example, but the description may apply to the case of using a 2-step random access procedure in which data and control information are placed in the message 1 and its response is transmitted to the UE by the message 2.

In addition, although FIG. 7B illustrates an example in which the relay station performs the access procedure of the transmission of the RACH preamble and after, the access procedure is not limited thereto, and any procedure may be used as long as the relay station can be connected with the assistance of the base station.

(Radio Communication System)

A configuration of a radio communication system according to one embodiment of the present disclosure is hereinafter described. In the radio communication system, communication is performed by using one or a combination of the above-described aspects of the present disclosure.

Figure 8:
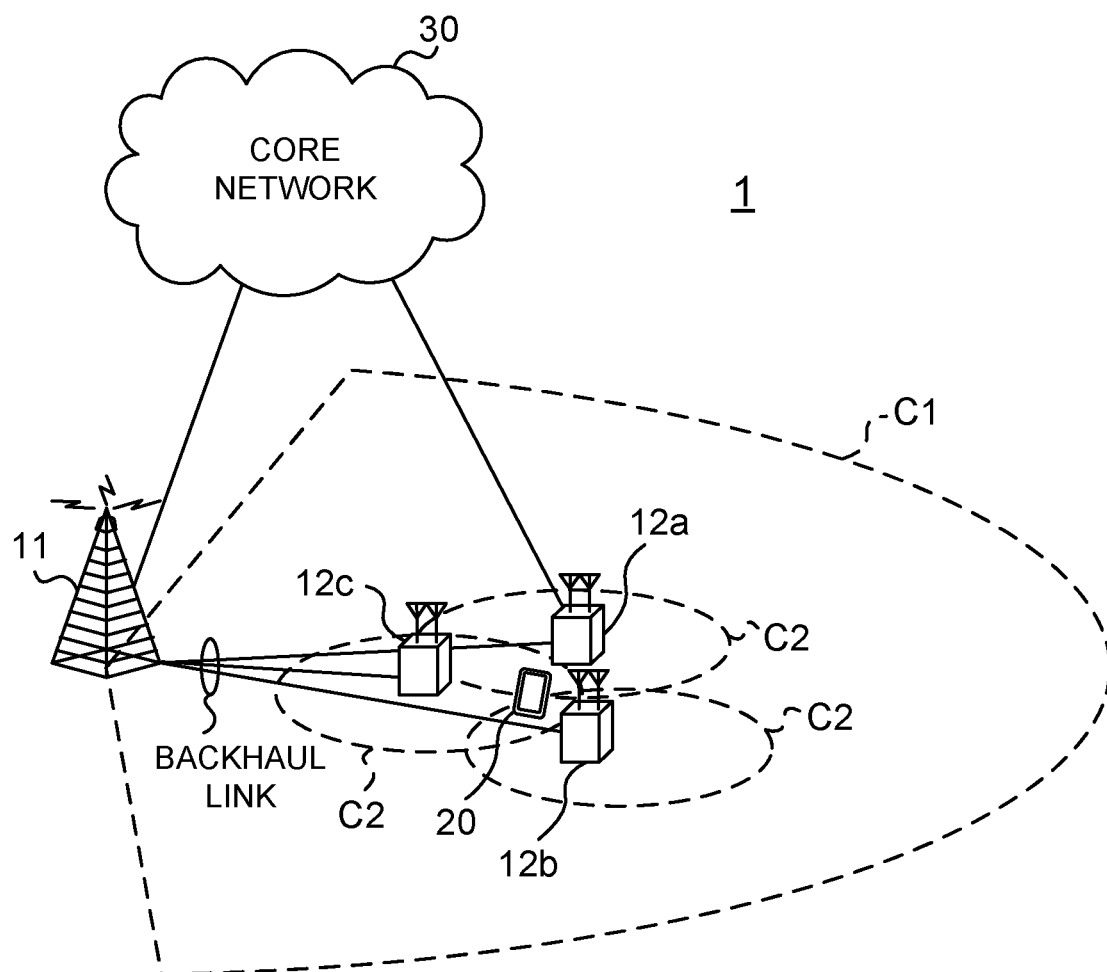
FIG. 8 is a diagram illustrating an example of a schematic configuration of a radio communication system according to one embodiment.

FIG. 8 is a diagram illustrating an example of a schematic configuration of a radio communication system according to one embodiment. A radio communication system 1 may be a system that implements communication using Long Term Evolution (LTE), 5th generation mobile communication system New Radio (5G NR), and the like specified by Third Generation Partnership Project (3GPP).

The radio communication system 1 may support dual connectivity (multi-RAT dual connectivity (MR-DC)) between a plurality of pieces of radio access technology (RAT). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, the NR base station (gNB) is MN, and an LTE (E-UTRA) base station (eNB) is SN.

The radio communication system 1 may support dual connectivity between a plurality of base stations in the same RAT (e.g., dual connectivity in which both MN and SN are NR base stations (gNB) (NR-NR dual connectivity (NN-DC)).

The radio communication system 1 may include a base station 11 and base stations 12 (12a to 12c). The base station 11 forms a macro cell C1 with a relatively wide coverage. The base stations 12 (12a to 12c) are disposed in the macro cell C1, and form a small cell C2 narrower than the macro cell C1. User terminal 20 may be located in at least one cell. The arrangement, number, and the like of cells and the user terminal 20 are not limited to the aspects illustrated in the drawings. The base stations 11 and 12 will be collectively referred to as base stations 10 unless these base stations are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and FR1 may correspond to a frequency range higher than FR2, for example.

The user terminal 20 may perform communication in each CC by using at least one of time division duplex (TDD) and frequency division duplex (FDD).

The plurality of base stations 10 may be connected by wire (e.g., optical fiber in compliance with common public radio interface (CPRI) or an X2 interface) or by radio (e.g., NR communication). For example, when NR communication is used as backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include at least one of, for example, an evolved packet core (EPC), a 5G core network (5GCN), and a next generation core (NGC).

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (e.g., another single carrier transmission method and another multi-carrier transmission method) may be used as UL and DL radio access methods.

In the radio communication system 1, a downlink shared channel (physical downlink shared channel (PDSCH)) shared by each user terminal 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, a system information block (SIB), and the like are transmitted by the PDSCH. User data, higher layer control information, and the like may be transmitted by the PUSCH. Master information block (MIB) may be transmitted by the PBCH.

Lower layer control information may be transmitted by the PDCCH. The lower layer control information may include, for example, downlink control information (DCI) including scheduling information of at least one of the PDSCH and the PUSCH.

Note that, the DCI that schedules the PDSCH may be referred to as DL assignment, DL DCI, and the like, and the DCI that schedules the PUSCH may be referred to as UL grant, UL DCI, and the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a certain search space on the basis of the search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, e.g., hybrid automatic repeat request acknowledgement (HARQ-ACK), ACK/NACK, and the like), and scheduling request (SR) may be transmitted by the PUCCH. A random access preamble for establishing connection with a cell may be transmitted by the PRACH.

Note that, in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be at least one of, for example, a primary synchronization signal (PSS) and a secondary synchronization signal (SSS). A signal block including SS (PSS and SSS) and PBCH (and DMRS for PBCH) may be referred to as an SS/PBCH block, an SS block (SSB), and the like. Note that SS, SSB, and the like may also be referred to as a reference signal.

Furthermore, in the radio communication system 1, a sounding reference signal (SRS), a demodulation reference signal (DMRS), and the like may be transmitted as an uplink reference signal (UL-RS). Note that, DMRSs may be referred to as "user equipment-specific reference signals (UE-specific Reference Signals)."

(Base Station)

Figure 9:
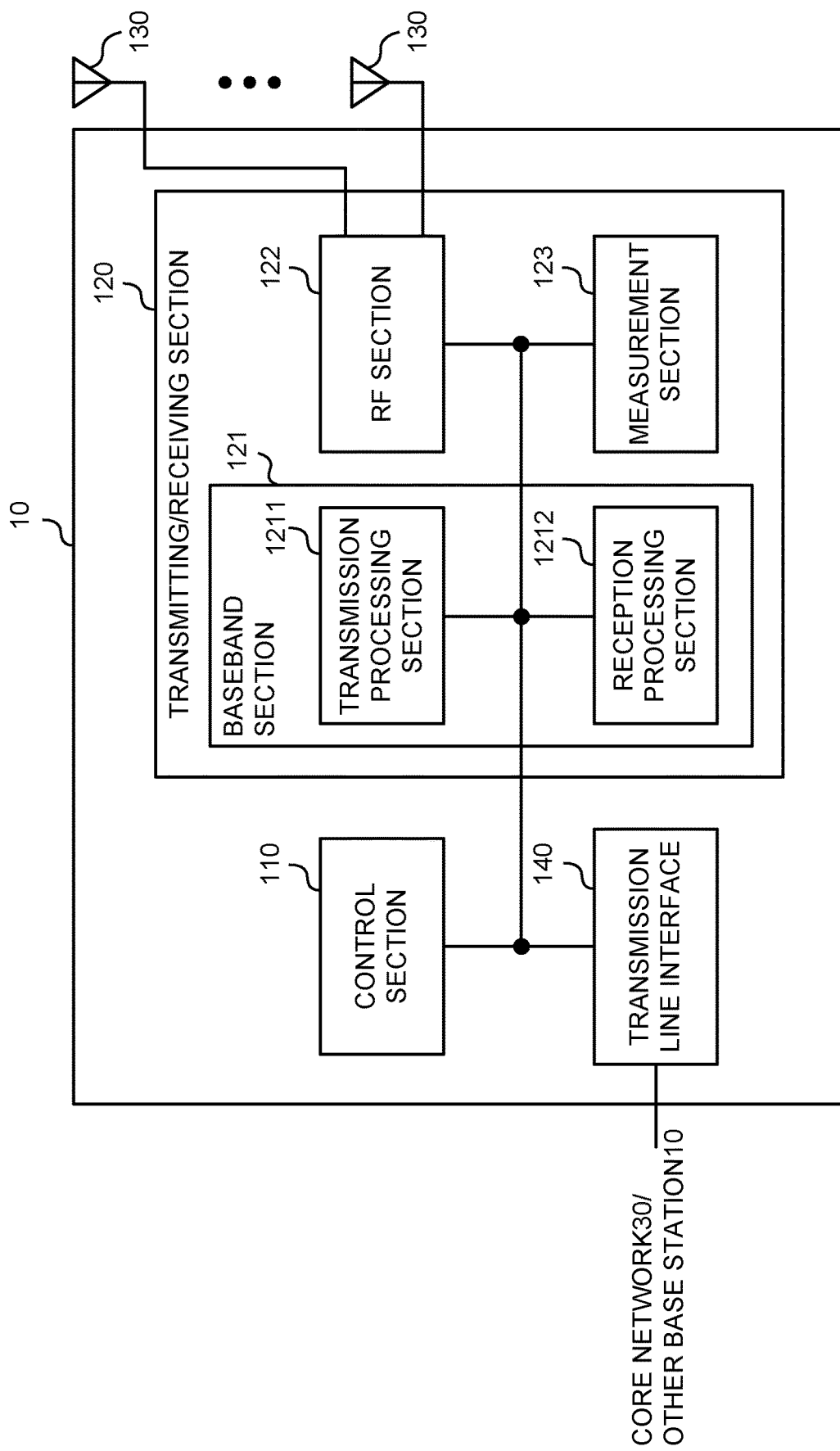
FIG. 9 is a diagram illustrating an example of a configuration of a base station according to one embodiment.

FIG. 9 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that the example mainly describes functional blocks of characteristic parts in the embodiment, and it may be assumed that the base station 10 also includes other functional blocks necessary for radio communication. A part of processing of each unit described below may be omitted.

The control section 110 controls the entire base station 10. The control section 110 can include a controller, a control circuit, and the like that are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or release) of a communication channel, management of the state of the base station 10, management of a radio resource, and the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can include an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correction coding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency range, filtering processing, amplification, and the like on the baseband signal, and may transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like on the basis of the received signal. The measurement section 123 may measure received power (for example, reference signal received power (RSRP)), reception quality (for example, reference signal reception quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus, another base station 10, or the like included in the core network 30, and may perform acquisition, transmission, or the like of user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

The base station 10 may be either the first base station 10 (for example, a relay station) or the second base station 10 (for example, the base stations 11 and 12).

The transmitting/receiving section 120 of the first base station 10 transmits the downlink control information via the downlink control channel. The transmitting/receiving section 120 may receive at least part of the downlink control information via a downlink shared channel from the second base station 10.

The transmitting/receiving section 120 of the first base station 10 receives the uplink control information via the uplink control channel. The transmitting/receiving section 120 may transmit at least part of the uplink control information via the uplink shared channel to the second base station 10 (for example, a base station).

The transmitting/receiving section 120 of the first base station 10 may transmit at least one of the synchronization signal and the broadcast signal. At least one of the synchronization signal and the broadcast signal may be based on the same cell identifier as that of the second base station 10 (for example, a base station). The transmitting/receiving section 120 may receive the random access preamble from the user terminal 20.

The transmitting/receiving section 120 of the second base station 10 may transmit at least part of the downlink control information transmitted from the first base station 10 to the user terminal 20 via the downlink shared channel. The transmitting/receiving section 120 may receive at least part of the uplink control information received by the first base station 10 via the uplink shared channel.

The transmitting/receiving section 120 of the second base station 10 may transmit at least one of the synchronization signal and the broadcast signal.

The control section 110 of the first base station 10 may control reception of downlink shared channel or transmission of uplink shared channel scheduled by the downlink control information. The control section 110 may control generation of the downlink control information on the basis of the control information received via a downlink shared channel from the second base station 10.

The control section 110 of the first base station 10 may control at least one of the communication of the first use case (for example, NR-IoT communication) and communication of the second use case (for example, eMBB/URLLC communication) in the first radio link (for example, an access link) with the user terminal 20.

The control section 110 of the second base station 10 may control at least one of the communication of the second use case (for example, eMBB/URLLC communication) in the second radio link (for example, a backhaul link) with the first base station 10.

(User Terminal)

Figure 10:
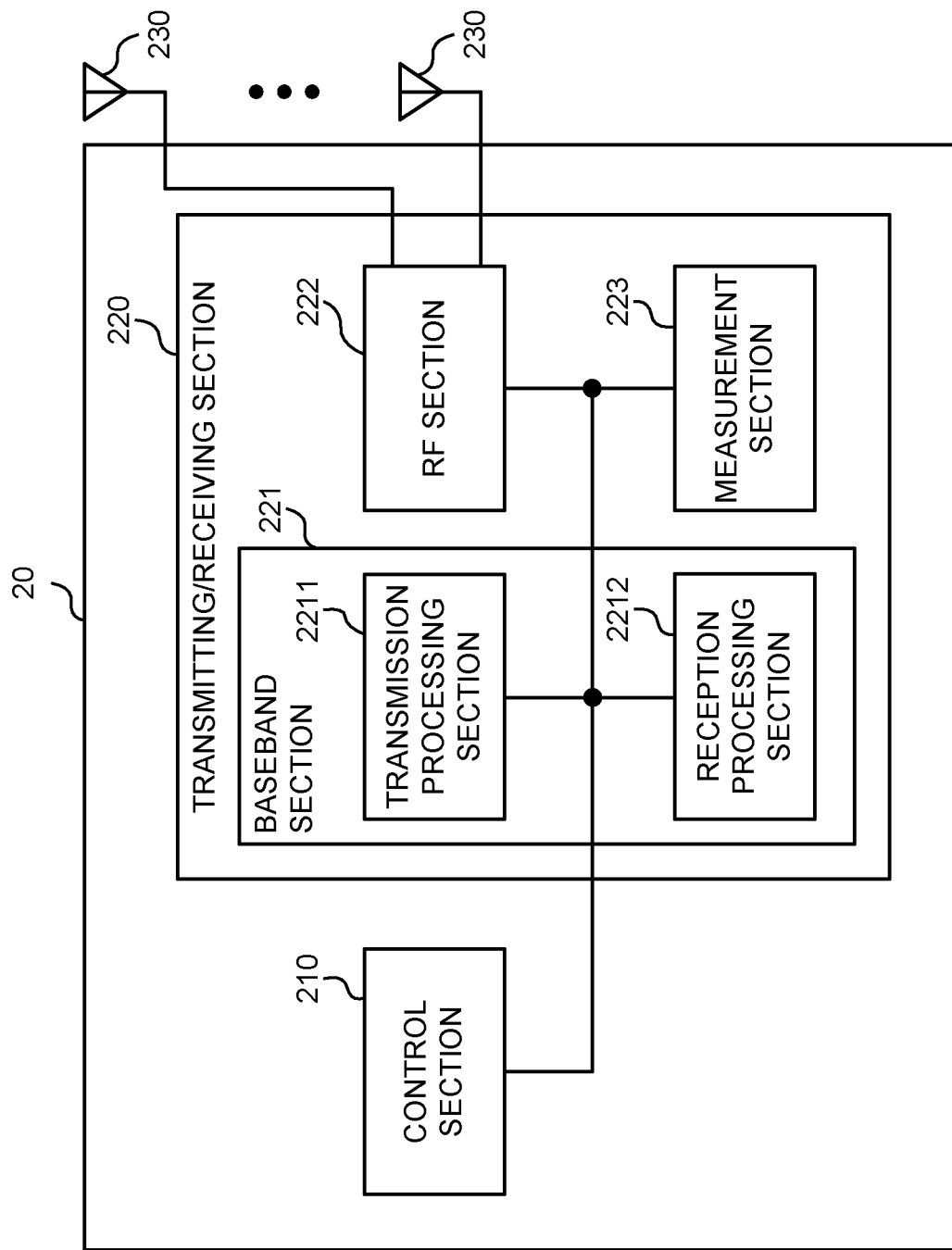
FIG. 10 is a diagram illustrating an example of a configuration of user terminal according to one embodiment.

FIG. 10 is a diagram illustrating an example of a configuration of user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that the example mainly describes functional blocks of characteristic parts in the embodiment, and it may be assumed that the user terminal 20 also includes other functional blocks necessary for radio communication. A part of processing of each unit described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described on the basis of common recognition in the technical field related to the present disclosure.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data or control information acquired from the control section 210 to generate a bit string to be transmitted.

The transmitting/receiving section 220 (transmission processing section 2211) may perform transmission processing such as channel encoding (which may include error correction coding), modulation, mapping, filtering processing, DFT processing (if necessary), IFFT processing, precoding, or digital-analog transform on a bit string to be transmitted, and may output a baseband signal.

Note that whether or not to apply DFT processing may be based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When it is not the case, DFT processing may not be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), reception quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220 and the transmission/reception antenna 230.

The transmitting/receiving section 220 may transmit or receive a signal to or from at least one of the first base station 10 (for example, the relay station), the second base station 10 (for example, the base stations 11 and 12), and another user terminal 20.

The transmitting/receiving section 220 receives the downlink control information via the downlink control channel from the first base station 10 (for example, the relay station). At least a part of the downlink control information is received by the first base station 10 (for example, the relay station) via a downlink shared channel from the second base station 10 (for example, the base station).

The transmitting/receiving section 220 transmits the uplink control information via the uplink control channel to the first base station 10 (for example, the relay station). At least a part of the uplink control information is transmitted by the first base station 10 (for example, the relay station) via the uplink shared channel to the second base station 10 (for example, the base station).

The control section 210 controls reception of a downlink shared channel from the first base station 10 or transmission of an uplink shared channel to the first base station on the basis of the downlink control information.

The control section 210 controls the transmission of the random access channel to the first base station 10 based on at least one of the synchronization signal and the broadcast signal from the first base station 10 (for example, the relay station). At least one of the synchronization signal and the broadcast signal may be based on the same cell identifier as that of the second base station 10 (for example, a base station).

The control section 210 may control the transmission of the random access channel to the first base station 10 (for example, the relay station) based on at least one of the synchronization signal and the broadcasting signal from the second base station 10 (for example, the base station).

The control section 210 may control either the communication of the first use case (for example, NR-IoT communication) or the communication of the second use case (for example, eMBB/URLLC communication) in the first radio link (for example, an access link) with the first base station 10 (for example, the relay station).

(Hardware Configuration)

Note that the block diagrams that have been used to describe the above embodiments illustrate blocks in functional units. These functional blocks (configuration sections) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (using wires, radio, or the like, for example) and using these plural apparatuses. The functional blocks may be implemented by combining software with the one apparatus or the plurality of apparatuses.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like. For example, a functional block (configuration section) that causes transmission to function may be called as a transmitting unit, a transmitter and the like. In any case, as described above, the implementation method is not particularly limited.

Figure 11:
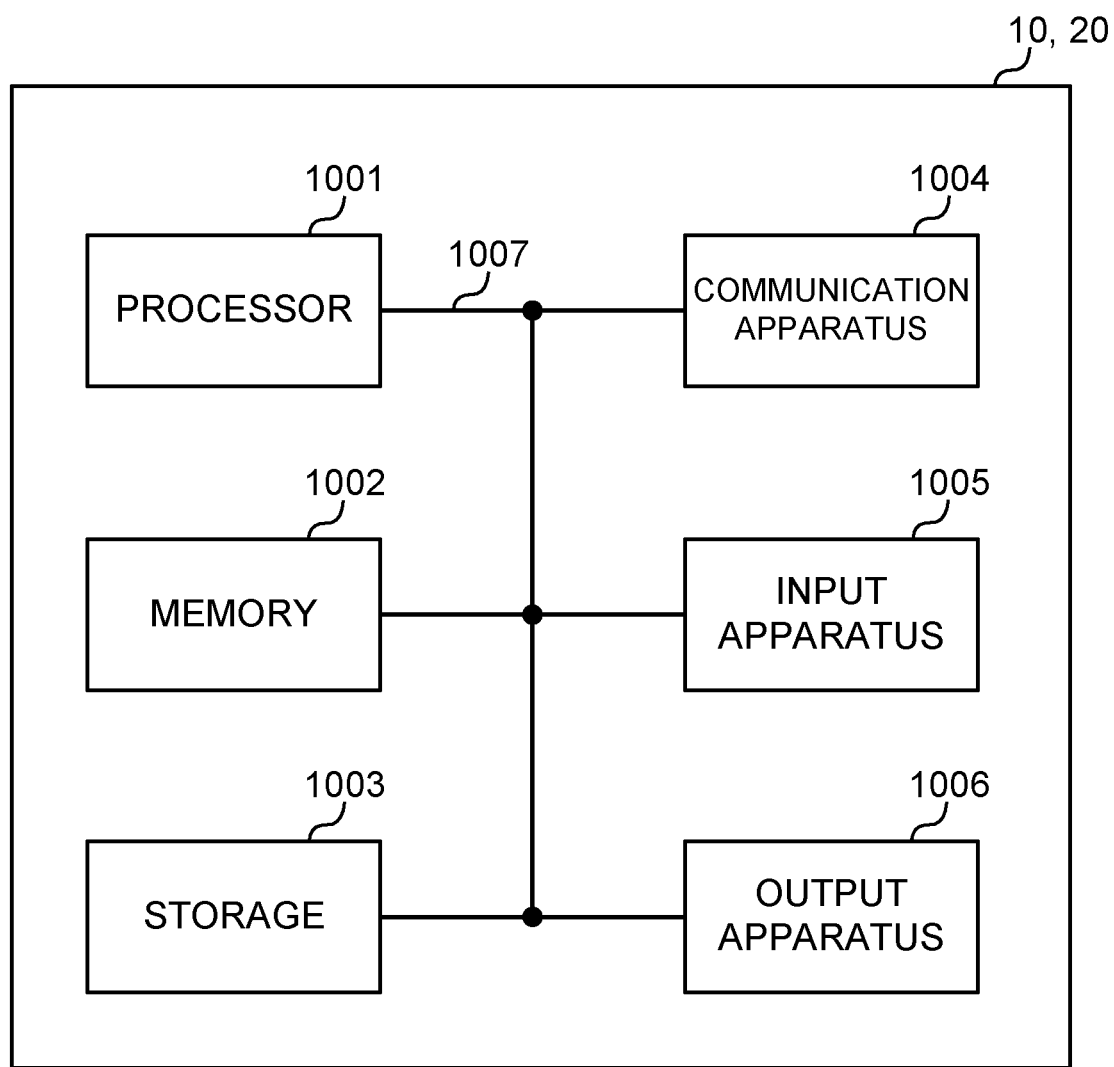
FIG. 11 is a diagram illustrating an example of a hardware configuration of a base station and user terminal according to one embodiment.

For example, a base station, user terminal, and the like according to one embodiment of the present disclosure may function as a computer that executes the processing of the radio communication method of the present disclosure. FIG. 11 is a diagram illustrating an example of a hardware configuration of the base station and the user terminal according to one embodiment. The above-described base station 10 and user terminal 20 may be physically configured as a computer apparatus including a processor 1001, a memory 1002, a storage 1003, a communication apparatus 1004, an input apparatus 1005, an output apparatus 1006, a bus 1007, and the like.

Note that, in the present disclosure, the wording such as an apparatus, a circuit, a device, and a section, and a unit can be replaced with each other. The hardware configuration of the base station 10 and the user terminal 20 may be configured to include one or a plurality of apparatuses illustrated in the figures, or may be configured without including some apparatuses.

For example, although only one processor 1001 is illustrated, a plurality of processors may be provided. Further, the processing may be executed by one processor, or the processing may be executed simultaneously, in sequence, or in different manners, by two or more processors. Note that the processor 1001 may be implemented with one or more chips.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 may control the whole computer by, for example, running an operating system. The processor 1001 may include a central processing unit (CPU) including an interface with peripheral equipment, a control apparatus, an arithmetic apparatus, a register, and the like. For example, at least a part of the above-described control section 110 (210), transmitting/receiving section 120(220), and the like may be implemented by the processor 1001.

Further, the processor 1001 reads a program (program code), a software module, data, and the like from at least one of the storage 1003 and the communication apparatus 1004 into the memory 1002, and executes various types of processing according to these. As the program, a program to cause a computer to execute at least a part of the operation described in the above-described embodiment is used. For example, the control section 110(210) may be implemented by a control program that is stored in the memory 1002 and operates in the processor 1001, and another functional block may be implemented similarly.

The memory 1002 is a computer-readable recording medium, and may include at least one of, for example, a read only memory (ROM), an erasable programmable rom (EPROM), an electrically EPROM (EEPROM), a random access memory (RAM), and other appropriate storage media. The memory 1002 may be referred to as a register, a cache, a main memory (main storage apparatus), and the like. The memory 1002 can store a program (program code), a software module, and the like, which can be executed for implementing the radio communication method according to one embodiment of the present disclosure.

The storage 1003 is a computer-readable recording medium, and may include at least one of, for example, a flexible disk, a floppy (registered trademark) disk, a magneto-optical disk (e.g., compact disc (compact disc ROM (CD-ROM) and the like), digital versatile disc, Blu-ray (registered trademark) disk), a removable disk, a hard disk drive, a smart card, a flash memory device (e.g., card, stick, and key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network or a radio network, and is referred to as, for example, a network device, a network controller, a network card, and a communication module. The communication apparatus 1004 may include a high frequency switch, a duplexer, a filter, a frequency synthesizer, and the like in order to implement at least one of, for example, frequency division duplex (FDD) and time division duplex (TDD). For example, the transmitting/receiving section 120(220), the transmission/reception antenna 130(230), and the like described above may be implemented by the communication apparatus 1004. The transmitting/receiving section 120(220) may be implemented by physically or logically separating a transmitting section 120a(220a) and a receiving section 120b(220b) from each other.

The input apparatus 1005 is an input device that receives an input from outside (for example, a keyboard, a mouse, a microphone, a switch, a button, a sensor, and the like). The output apparatus 1006 is an output device for performing outputting to the outside (for example, a display, a speaker, a light emitting diode (LED) lamp, and the like). Note that the input apparatus 1005 and the output apparatus 1006 may be an integrated configuration (e.g., touch panel).

Further, the apparatuses such as the processor 1001 and the memory 1002 are connected by the bus 1007 for communicating information. The bus 1007 may be configured by a single bus, or may be configured by buses that vary between apparatuses.

The base station 10 and the user terminal 20 may include hardware such as a microprocessor, a digital signal processor (DSP), an application specific integrated circuit (ASIC), a programmable logic device (PLD), and a field programmable gate array (FPGA), and a part or all of each functional block may be implemented by the hardware. For example, the processor 1001 may be implemented with at least one of these pieces of hardware.

(Variations)

Note that terms described in the present disclosure and terms necessary for understanding the present disclosure may be replaced with other terms that have the same or similar meanings. For example, a channel, a symbol, and a signal (or signaling) may be replaced with each other. Further, the signal may be a message. The reference signal can be abbreviated as an RS, and may be referred to as a pilot, a pilot signal and the like, depending on which standard applies. Further, a component carrier (CC) may be referred to as a cell, a frequency carrier, a carrier frequency, and the like.

A radio frame may include one or a plurality of periods (frames) in the time domain. Each of one or a plurality of periods (frames) constituting a radio frame may be referred to as a subframe. Furthermore, a subframe may be constituted by one or a plurality of slots in the time domain. The subframe may be a fixed time length (e.g., 1 ms) that does not depend on numerology.

Here, the numerology may be a communication parameter applied to at least one of transmission and reception of a signal or a channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

The slot may include one or a plurality of symbols (e.g., orthogonal frequency division multiplexing (OFDM) symbol and single carrier frequency division multiple access (SC-FDMA) symbol) in the time domain. Further, the slot may be a time unit based on numerology.

The slot may include a plurality of mini slots. Each mini slot may be constituted by one or a plurality of symbols in the time domain. Further, a mini slot may be referred to as a subslot. Each mini slot may be constituted by fewer symbols than a slot. A PDSCH (or PUSCH) transmitted in a time unit larger than a mini slot may be referred to as PDSCH (PUSCH) mapping type A. A PDSCH (or PUSCH) transmitted using the mini slot may be referred to as PDSCH (PUSCH) mapping type B.

A radio frame, a subframe, a slot, a mini slot and a symbol all represent the time unit in signal transmission. The radio frame, the subframe, the slot, the mini slot, and the symbol may be each called by other applicable names. Note that a time unit such as the frame, the subframe, the slot, the mini slot, and the symbol in the present disclosure may be replaced with each other.

For example, one subframe may be referred to as TTI. A plurality of consecutive subframes may be referred to as TTI. One slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of TTI is not limited thereto.

The TTI may be a transmission time unit of channel-encoded data packets (transport blocks), code blocks, codewords, or the like, or may be a unit of processing in scheduling, link adaptation, and so on. Note that, when the TTI is given, a time interval (for example, the number of symbols) to which the transport block, code block, codeword, and the like are actually mapped may be shorter than the TTI.

Note that, when one slot or one mini slot is referred to as TTI, one or more TTIs (i.e., one or more slots or one or more mini slots) may be the minimum time unit of scheduling. Further, the number of slots (the number of mini slots) constituting the minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that the long TTI (e.g., usual TTI and subframe) may be replaced with TTI having a time length more than 1 ms, and the short TTI (e.g., shortened TTI) may be replaced with TTI having a TTI length less than the TTI length of the long TTI and not less than 1 ms.

A resource block (RB) is the unit of resource allocation in the time domain and the frequency domain, and may include one or a plurality of consecutive subcarriers in the frequency domain. The number of subcarriers in RB may be the same regardless of numerology, and may be 12, for example. The number of subcarriers included in the RB may be determined on the basis of the numerology.

Further, the RB may include one or a plurality of symbols in the time domain, and may have a length of one slot, one mini slot, one subframe, or one TTI. Each of one TTI, one subframe, and the like each may include one or a plurality of resource blocks.

Note that one or a plurality of RBs may be referred to as a physical resource block (Physical RB (PRB)), a sub-carrier group (SCG), a resource element group (REG), a PRB pair, an RB pair, and the like.

Further, the resource block may be constituted by one or a plurality of resource elements (REs). For example, one RE may be a radio resource domain of one subcarrier and one symbol.

The bandwidth part (BWP) (which may be called partial bandwidth and the like) may represent a subset of consecutive common resource blocks (RB) for certain numerology in a certain carrier. Here, the common RB may be specified by an RB index with reference to a common reference point of the carrier. The PRB may be defined in a certain BWP and may be numbered within the BWP.

The BWP may include BWP for UL (UL BWP) and BWP for DL (DL BWP). For the UE, one or a plurality of BWPs may be configured within one carrier.

At least one of the configured BWPs may be active, and the UE need not assume that a given signal/channel is transmitted/received outside the active BWP. Note that "cell", "carrier", or the like in the present disclosure may be replaced with "BWP".

Note that the structures of radio frames, subframes, slots, mini slots, symbols and so on described above are merely examples. For example, configurations of the number of subframes in a radio frame, the number of slots per subframe or radio frame, the number of mini slots in a slot, the number of symbols and RBs in a slot or a mini slot, the number of subcarriers in RB, the number of symbols in TTI, a symbol length, a cyclic prefix (CP) length, and the like can be variously changed.

Further, the information, parameters, and the like described in the present disclosure may be represented in an absolute value, represented in a relative value from a given value, or represented by using other corresponding information. For example, a radio resource may be specified by a given index.

Names used for parameters and the like in the present disclosure are in no respect limiting. Further, a mathematical expression and the like using these parameters may differ from those explicitly disclosed in the present disclosure. Various channels (e.g., PUCCH and PDCCH) and information elements can be identified by any suitable name. Various names allocated to these various channels and information elements are in no respect limiting.

The information, signals, and the like described in the present disclosure may be represented by using any of various different pieces of technology. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output at least one of from higher layer to lower layer and from lower layer to higher layer. The information, signals, and the like may be input and output via a plurality of network nodes.

The information, signals, and the like that are input and/or output may be stored in a specific location (for example, in a memory), or may be managed in a control table. The information, signals, and the like to be input and output can be overwritten, updated or appended. The information, signals and the like that are output may be deleted. The input information, signals, and the like may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message and the like. Further, notification of MAC signaling may be performed using, for example, a MAC control element (MAC CE).

Further, notification of given information (for example, notification of "being X") is not limited to explicit notification but may be performed implicitly (for example, by not performing notification of the given information or by performing notification of another piece of information). Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Further, software, instruction, information, and the like may be transmitted/received via a transmission medium. For example, when software is transmitted from a website, a server, or other remote sources by using at least one of wired technology (coaxial cable, optical fiber cable, twisted-pair cable, digital subscriber line (DSL), and the like) or wireless technology (infrared light, microwave, and the like), at least one of these wired technology and wireless technology is included in the definition of the transmission medium.

The terms "system" and "network" used in the present disclosure can be used interchangeably. The "network" may mean an apparatus (e.g., base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", "component carrier", and the like may be interchangeably used. The base station may be referred to by a term such as a macro cell, a small cell, a femto cell, a pico cell, and the like.

The base station can accommodate one or a plurality of (for example, three) cells. When a base station accommodates a plurality of cells, the entire coverage area of the base station can be partitioned into a plurality of smaller areas. Each smaller area can provide communication service through a base station subsystem (e.g., indoor small base station (remote radio head (RRH))). The term "cell" or "sector" refers to a part or the whole of a coverage area of at least one of a base station and a base station subsystem that perform a communication service in this coverage.

In the present disclosure, the terms such as mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station or the mobile station may be referred to as a transmitting apparatus, a receiving apparatus, a radio communication apparatus, and the like. Note that at least one of the base station and the mobile station may be a device mounted on a moving body, a moving body itself and the like. The moving body may be a transportation (for example, a car, an airplane and the like), an unmanned moving body (for example, a drone, an autonomous car, and the like), or a (manned or unmanned) robot. Note that at least one of the base station and the mobile station includes an apparatus that does not necessarily move during a communication operation. For example, at least one of the base station and the mobile station may be Internet of Things (IoT) device such as a sensor.

Further, the base station in the present disclosure may be replaced with user terminal. For example, each aspect/embodiment of the present disclosure may be applied to a configuration in which communication between the base station and the user terminal is replaced with communication between a plurality of pieces of user terminal (which may be referred to as, for example, device-to-device (D2D) and vehicle-to-everything (V2X)). In this case, the user terminal 20 may be configured to have the functions of the base station 10 described above. Further, the wording such as "uplink" and "downlink" may be replaced with the wording corresponding to the terminal-to-terminal communication (for example, "side"). For example, an uplink channel, a downlink channel, and the like may be replaced with a side channel.

Similarly, the user terminal in the present disclosure may be replaced with a base station. In this case, the base station 10 may have the functions of the user terminal 20 described above.

In the present disclosure, the operation performed by the base station may be performed by an upper node thereof in some cases. In a network including one or a plurality of network nodes with a base station, it is clear that various operations performed so as to communicate with a terminal can be performed by a base station, one or more of network nodes (e.g., mobility management entity (MME) and serving-gateway (S-GW) may be possible, but are not limiting) other than the base station, or a combination thereof.

The aspects/embodiments described in the present disclosure may be used independently or in combination, and may be switched along with execution. Further, the order of processing procedures, sequences, flowcharts, and the like of the aspects/embodiments described in the present disclosure may be re-ordered as long as inconsistencies do not arise. For example, in the methods described in the present disclosure, various step elements are presented by using an illustrative order, and the methods are not limited to the presented specific order.

Each aspect/embodiment described in the present disclosure may be applied to a system using long term evolution (LTE), LTE-Advanced (LTE-A), LTE-Beyond (LTE-B), SUPER 3G, IMT-Advanced, 4th generation mobile communication system (4G), 5th generation mobile communication system (5G), future radio access (FRA), new-radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and other appropriate radio communication methods, a next generation system expanded based thereon, and the like. Furthermore, a plurality of systems may be combined to be applied (for example, a combination of LTE or LTE-A and 5G).

The phrase "on the basis of" as used in the present disclosure does not mean "on the basis of only", unless otherwise specified. In other words, the phrase "on the basis of" means both "on the basis of only" and "on the basis of at least".

Any reference to an element using designations such as "first" and "second" used in the present disclosure does not generally limit the amount or order of these elements. These designations may be used in the present disclosure as a method convenient in distinguishing between two or more elements. In this way, reference to the first and second elements does not imply that only two elements may be employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, and the like.

Furthermore, "determining" may be regarded as "determining" of receiving (for example, receiving of information), transmitting (for example, transmitting of information), input, output, accessing (for example, accessing to data in a memory), and the like.

Furthermore, "determining" may be regarded as "determining" of resolving, selecting, choosing, establishing, comparing, and the like. In other words, "determining" may be regarded as "determining" of a certain operation.

Furthermore, "determining" may be replaced with "assuming", "expecting", "considering", and the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

In the present disclosure, when two elements are connected, these elements may be considered to be "connected" or "coupled" to each other by using one or more electrical wires, cables, printed electrical connections, and the like, and by using, as some non-limiting and non-inclusive examples, electromagnetic energy having a wavelength in the radio frequency domain, microwave domain, and optical (both visible and invisible) domain, and the like.

In the present disclosure, the phrase "A and B are different" may mean "A and B are different from each other". Note that the phrase may mean that "A and B are different from C". The terms such as "separate", "coupled", and the like may be interpreted similarly to "different".

When "include", "including", and variations thereof are used in the present disclosure, these terms are intended to be inclusive similarly to the term "comprising". Furthermore, the term "or" used in the present disclosure is intended not to be exclusive-OR.

In the present disclosure, for example, when English articles such as "a", "an", and "the" are added in translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. An integrated access backhaul (IAB) node comprising:
a receiver that receives, from a base station, control information via a radio backhaul on a physical downlink shared channel (PDSCH); and
a processor that controls, based on information regarding a time domain resource included in the control information received from the base station, scheduling of a PDSCH or a physical uplink shared channel (PUSCH) for a terminal, the PDSCH or PUSCH for the terminal being transmitted or received via an access link by the IAB node.

2. The IAB node according to claim 1, wherein the processor multiplexes, in at least one of a time domain and a frequency domain, a plurality of channels including at least one of the PDSCH and PUSCH that are transmitted via the access link in the scheduling.

3. The IAB node according to claim 1, wherein, based on the control information, the processor generates a downlink control information (DCI) for use in the scheduling and transmits the DCI via a physical downlink control channel (PDCCH) of the access link.

4. A radio communication method for an integrated access backhaul (IAB) node, the method comprising:
receiving, from a base station, control information via a radio backhaul on a physical downlink shared channel (PDSCH); and
controlling, based on information regarding a time domain resource included in the control information received from the base station, scheduling of a PDSCH or a physical uplink shared channel (PUSCH) for a terminal, the PDSCH or PUSCH for the terminal being transmitted or received via an access link by the IAB node.

5. A base station comprising:
a processor that generates control information including information regarding a time domain resource for controlling scheduling of a physical downlink shared channel (PDSCH) or a physical uplink shared channel (PUSCH) for a terminal in an integrated access backhaul (IAB) node, the PDSCH or PUSCH for the terminal being transmitted or received via an access link by the IAB node; and
a transmitter that transmits, to the IAB node, the control information generated by the processor via a radio backhaul on a PDSCH.

6. A system comprising an integrated access backhaul (IAB) node and a base station, wherein
the IAB node comprises:
a receiver that receives, from the base station, control information via a radio backhaul on a physical downlink shared channel (PDSCH); and
a processor that controls, based on information regarding a time domain resource included in the control information received from the base station, scheduling of a PDSCH or a physical uplink shared channel (PUSCH) for a terminal, the PDSCH or PUSCH for the terminal being transmitted or received via an access link by the IAB node, and
the base station comprises:
a processor that generates the control information; and
a transmitter that transmits, to the IAB node, the control information via the radio backhaul on the PDSCH.

* * * * *